(12) United States Patent
Copeland

(10) Patent No.: US 10,161,639 B2
(45) Date of Patent: Dec. 25, 2018

(54) HEAT TRANSFER APPARATUS AND HEAT TRANSFER SYSTEM FOR MASONRY HEATER

(71) Applicant: Joseph Copeland, Fairbanks, AK (US)

(72) Inventor: Joseph Copeland, Fairbanks, AK (US)

(*) Notice: Subject to any disclaimer, the term of this patent is extended or adjusted under 35 U.S.C. 154(b) by 543 days.

(21) Appl. No.: 14/643,850

(22) Filed: Mar. 10, 2015

(65) Prior Publication Data

US 2016/0265793 A1 Sep. 15, 2016

(51) Int. Cl.
| | | |
|---|---|---|
| *F24D 11/00* | (2006.01) | |
| *F24D 3/02* | (2006.01) | |
| *F24D 19/10* | (2006.01) | |
| *F24B 9/00* | (2006.01) | |
| *F28D 21/00* | (2006.01) | |
| *F24H 7/04* | (2006.01) | |
| *F28D 7/08* | (2006.01) | |

(52) U.S. Cl.
CPC ............ *F24D 11/002* (2013.01); *F24B 9/00* (2013.01); *F24D 3/02* (2013.01); *F24D 19/1012* (2013.01); *F24D 19/1015* (2013.01); *F28D 21/0007* (2013.01); *F24D 2200/06* (2013.01); *F24H 7/0491* (2013.01); *F28D 7/08* (2013.01); *Y02B 30/745* (2013.01)

(58) Field of Classification Search
CPC ............ F24D 11/002; F24D 19/1012; F24D 19/1015; F24D 2200/06; F24B 9/00; F28D 21/0007; F28D 7/08; F24H 7/0491; F24H 9/2057; F24H 9/2007; Y02B 30/745
See application file for complete search history.

(56) References Cited

U.S. PATENT DOCUMENTS

| 13,525 | A | * | 9/1855 | Leeds | ............... | F24H 3/00 126/109 |
|---|---|---|---|---|---|---|
| 70,679 | A | * | 11/1867 | Arthurs | ............ | F24H 3/00 126/104 R |
| 700,664 | A | * | 5/1902 | Bryan | ............. | F24H 3/00 126/109 |
| 1,758,643 | A | * | 5/1930 | Baetz | ............. | F28D 7/08 165/122 |
| 2,159,284 | A | * | 5/1939 | Miller | ......... | F24D 19/1066 236/9 A |
| 2,300,058 | A | * | 10/1942 | Osborn, Jr. | ........ | F28D 7/08 138/38 |

(Continued)

OTHER PUBLICATIONS

Senf, Norbert, "Heating Water with Masonry Heaters," MHA News, Feb. 1997, 3 pages.

(Continued)

*Primary Examiner* — Travis Ruby
(74) *Attorney, Agent, or Firm* — George C. Rondeau, Jr.; Davis Wright Tremain LLP

(57) ABSTRACT

An apparatus and system for efficiently and safely transferring heat from a masonry heater to an external heating device using coil pipes and a liquid circulation pump. Circulation of a heat transfer liquid in the apparatus and system is controlled based on the measured temperature of the heat transfer liquid in the coil pipe on a return side of the masonry heater. Two additional sensors near the external heating device are used to control the flow rate of the circulation of the heat transfer liquid in the apparatus and system, thereby controlling the amount of heat actually transferred to the external heating device.

30 Claims, 21 Drawing Sheets

(56) References Cited

U.S. PATENT DOCUMENTS

| | | | | |
|---|---|---|---|---|
| 2,626,524 | A | * | 1/1953 | Harman .................. G01K 5/00 239/289 |
| 2,820,839 | A | * | 1/1958 | Schunke ............... G01K 13/02 136/231 |
| 2,920,608 | A | * | 1/1960 | Orban .................. F22B 1/16 122/20 B |
| 2,981,106 | A | * | 4/1961 | Knudsen ................ G01K 1/08 136/202 |
| 3,526,134 | A | * | 9/1970 | Schaus ................. G01K 13/02 374/148 |
| 3,720,259 | A | * | 3/1973 | Fritz .................. F28D 7/04 165/162 |
| 3,745,828 | A | * | 7/1973 | Howell ................. B22D 2/006 164/450.3 |
| 4,095,586 | A | * | 6/1978 | Selva .................. A21B 1/04 126/273 R |
| 4,139,152 | A | * | 2/1979 | Kronberger, Jr. ....... F24B 1/183 126/514 |
| 4,248,204 | A | * | 2/1981 | Rowe ................... F24B 1/24 126/400 |
| 4,285,238 | A | * | 8/1981 | Wilson ................. F02B 61/02 374/144 |
| 4,323,051 | A | * | 4/1982 | Auerbach .............. F24B 5/026 126/101 |
| 4,360,003 | A | * | 11/1982 | Hardy .................. F24B 9/00 122/33 |
| 4,372,487 | A | * | 2/1983 | Hollister .............. F23C 9/00 122/20 B |
| 4,403,573 | A | * | 9/1983 | Cauchy ................. F24B 9/00 110/234 |
| 4,462,542 | A | | 7/1984 | Person |
| 4,466,420 | A | | 8/1984 | Ernisse et al. |
| 4,471,752 | A | * | 9/1984 | Halchek ................ F24B 5/021 126/112 |
| 4,547,079 | A | * | 10/1985 | Alamprese .............. G01K 3/02 374/116 |
| 4,601,426 | A | * | 7/1986 | Brosenius .............. F24D 3/02 237/56 |
| 4,679,729 | A | * | 7/1987 | Petitjean .............. F24D 3/02 236/91 F |
| 5,056,712 | A | | 10/1991 | Enck |
| 5,119,988 | A | * | 6/1992 | Fiedrich .............. F24D 19/1033 237/59 |
| 5,462,359 | A | * | 10/1995 | Reichl ................. G01K 13/02 338/22 R |
| 5,617,994 | A | * | 4/1997 | Fiedrich ............... F24D 3/02 237/63 |
| 5,660,165 | A | | 8/1997 | Lannes |
| 5,915,415 | A | * | 6/1999 | Huang ................. F16K 11/0445 137/551 |
| 5,922,939 | A | * | 7/1999 | Cota ................... G01N 27/225 73/29.01 |
| 6,449,969 | B1 | * | 9/2002 | Fujimoto ............. F24F 11/008 165/247 |
| 6,485,175 | B1 | * | 11/2002 | Nimberger ............. G01F 1/36 374/142 |
| 6,708,083 | B2 | * | 3/2004 | Orthlieb ............. G05D 23/1934 236/46 R |
| 6,820,685 | B1 | * | 11/2004 | Carter ................. F28B 1/06 165/150 |
| 7,246,941 | B2 | * | 7/2007 | Shike .................. G01K 5/52 374/141 |
| 7,377,687 | B2 | * | 5/2008 | Chana .................. G01K 13/02 374/110 |
| 7,380,984 | B2 | * | 6/2008 | Wuester ................ G01K 1/08 374/141 |
| 7,415,901 | B2 | * | 8/2008 | Desrochers ............ G01N 1/26 236/1 B |
| 7,581,879 | B2 | * | 9/2009 | Miyahara .............. G01K 1/08 374/148 |
| 7,600,914 | B2 | * | 10/2009 | Bronnert .............. G01K 1/08 374/163 |
| 8,182,146 | B2 | * | 5/2012 | Brun .................. G01K 1/10 374/139 |
| 8,197,134 | B2 | * | 6/2012 | Robinson .............. G01K 7/023 374/148 |
| 8,939,196 | B2 | * | 1/2015 | Morita ................. F24F 11/008 165/11.1 |
| 2002/0039378 | A1 | * | 4/2002 | Shibayama ............ G01K 13/02 374/148 |
| 2003/0108344 | A1 | | 6/2003 | Andersson et al. |
| 2004/0241602 | A1 | | 12/2004 | Bechard |
| 2007/0074863 | A1 | * | 4/2007 | Ichinose ............. G05D 23/192 165/247 |
| 2007/0074864 | A1 | * | 4/2007 | Ichinose ............. F24H 1/185 165/247 |
| 2007/0074865 | A1 | * | 4/2007 | Ichinose ............. G05D 27/02 165/247 |
| 2007/0110124 | A1 | * | 5/2007 | Shiraki ................ G01K 1/08 374/208 |
| 2008/0022949 | A1 | * | 1/2008 | Harth .................. F22B 37/202 122/511 |
| 2009/0032236 | A1 | * | 2/2009 | Geadelmann .......... F24F 1/0007 165/270 |
| 2009/0211357 | A1 | * | 8/2009 | Pinto .................. G01D 11/245 73/335.02 |
| 2010/0078160 | A1 | * | 4/2010 | Novotny ................ F24F 3/06 165/247 |
| 2010/0195698 | A1 | * | 8/2010 | Hori ................... G01K 1/20 374/148 |
| 2011/0122918 | A1 | * | 5/2011 | Murray ................. F22B 37/46 374/208 |
| 2011/0259560 | A1 | | 10/2011 | Kinoshita |
| 2012/0193086 | A1 | * | 8/2012 | van Dijk .............. G01K 1/14 165/287 |
| 2013/0070806 | A1 | * | 3/2013 | Kubiak ................. G01K 13/02 374/148 |
| 2015/0013961 | A1 | * | 1/2015 | Perrin ................. F24D 19/1012 165/298 |
| 2015/0192445 | A1 | * | 7/2015 | Olin ................... G01F 1/6842 702/45 |
| 2015/0369494 | A1 | * | 12/2015 | Skovmose Kallesoe .................. F24D 19/1006 165/247 |
| 2016/0178220 | A1 | * | 6/2016 | Benson ................. C09K 5/20 237/8 A |
| 2016/0231180 | A1 | * | 8/2016 | Mori ................... G01K 7/22 |

OTHER PUBLICATIONS

"Fluidbed Roaster," Homeroasters.org—Discussion Forum: Building a Roaster [online], [retrieved on Aug. 18, 2015] <http://www.homeroasters.org/php/forum/viewthread.php?thread_id=3968>.

* cited by examiner

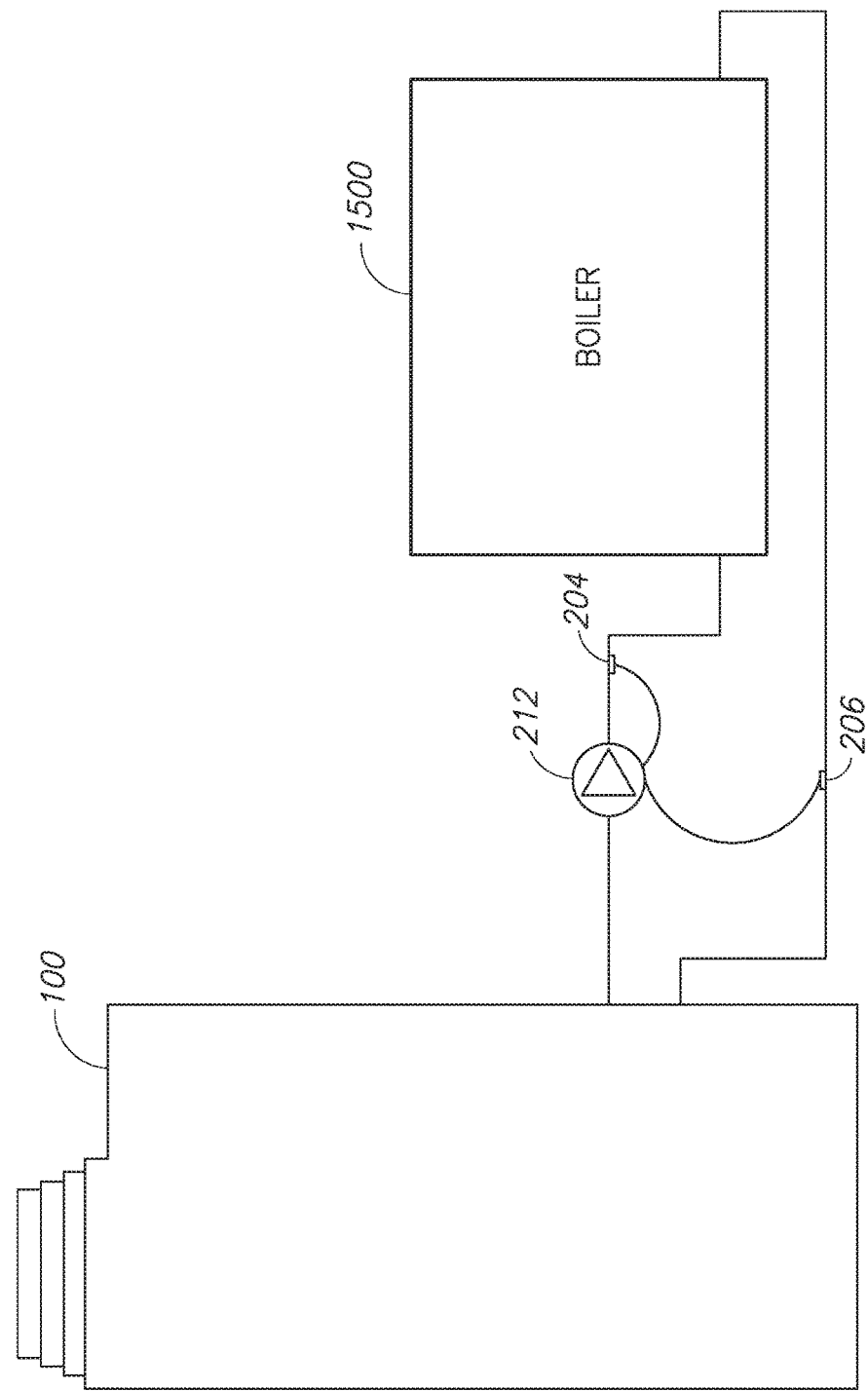

HEAT TRANSFER APPARATUS AND HEAT TRANSFER SYSTEM FOR MASONRY HEATER

FIELD OF INVENTION

The present invention relates to apparatus and systems for efficiently transferring heat from a masonry heater to other devices separate from the masonry heater.

BACKGROUND OF THE INVENTION

The following description includes information that may be useful in understanding the present invention. It is not an admission that any of the information provided herein is prior art or relevant to the presently claimed invention, or that any publication specifically or implicitly referenced is prior art.

Masonry heaters are devices used to heat the interior of a building by absorbing the intense heat of a fire into masonry material and gradually releasing the heat over a period of hours. Although the radiant heat released by the masonry heater is low compared to other heaters, the temperatures inside masonry heaters can reach in excess of 2000° F.—far more than conventional metal furnaces can handle. Efficiently and effectively capturing and transferring the intense heat from masonry heaters to other devices would drastically reduce the energy required to heat other areas and/or fluids. However, previous attempts to capture and transfer heat from masonry heaters have been less successful than desired.

DETAILED DESCRIPTION OF THE DRAWINGS

Exemplary embodiments are illustrated in the referenced figures. The embodiments and figures disclosed herein are intended to be illustrative rather than restrictive.

FIG. 15 illustrates an external heating device (boiler) connected to a heat transfer apparatus.

DETAILED DESCRIPTION OF THE INVENTION

One skilled in the art will recognize many methods, systems, and materials similar or equivalent to those described herein. The present invention is in no way limited to the methods, systems, and materials described.

Embodiments of the present invention relate to apparatuses and systems for capturing and transferring heat from a masonry heater to a device external to the masonry heater. It is desirable to capture the heat from a masonry heater to increase the overall efficiency of a household and reduce the cost of heating water and air, for example, during cold winter months. Embodiments of the present invention significantly improve the amount of energy captured and transferred from a masonry heater compared to previously known designs.

Figure 1:
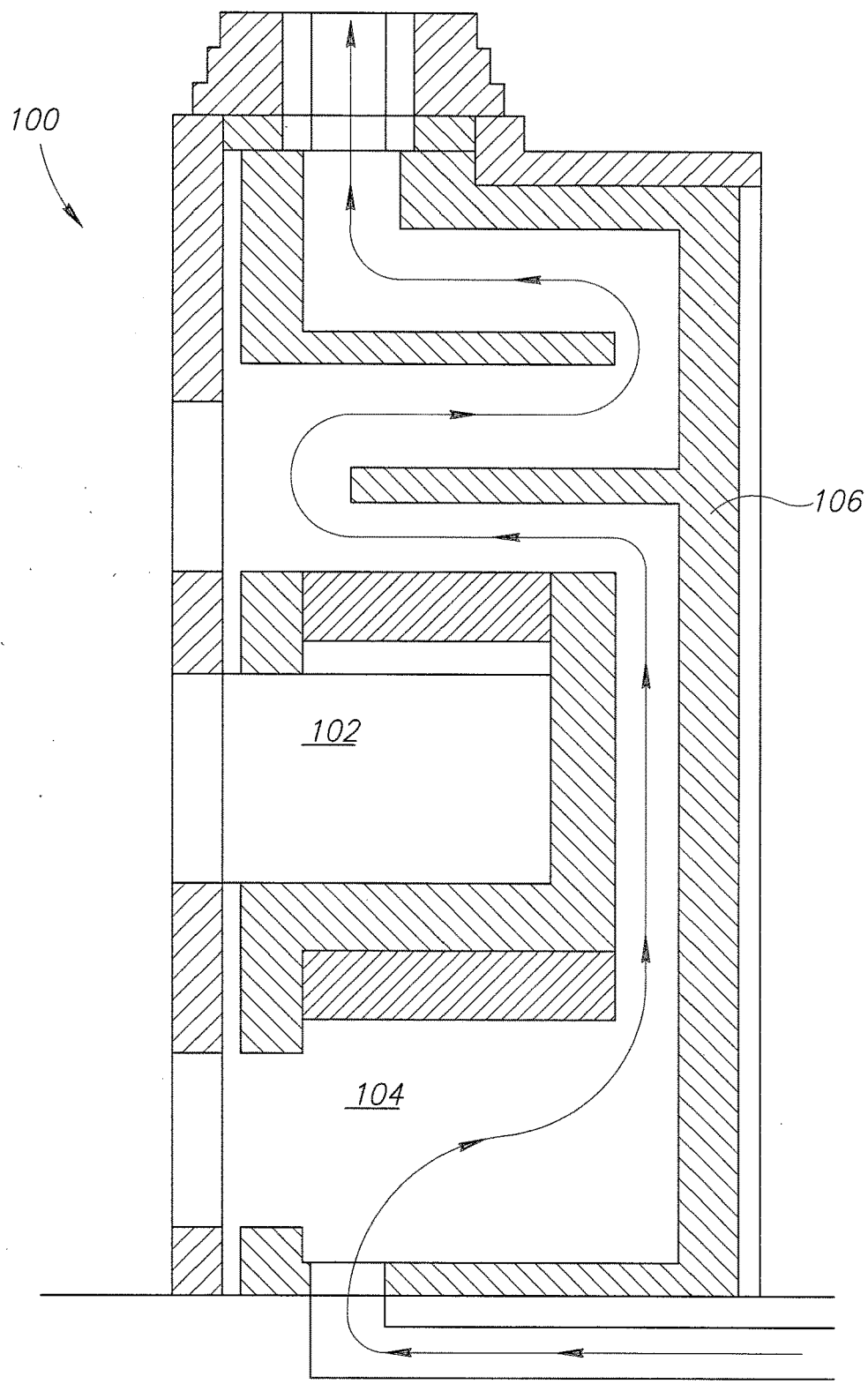
FIG. 1 illustrates a prior art masonry heater.

Referring to FIG. 1, masonry heater 100 is composed primarily of a masonry material, such as stone, brick or tile, instead of metal. Fuel, usually wood, is burned in the firebox 104 of the masonry heater 100 where temperatures may exceed 2000° F., causing combustion of nearly all gases in the firebox 104. In contrast, metal stoves are designed to vent gases to prevent the gases from melting or damaging the metal housing. Once the fuel is lit in the firebox 104, the masonry absorbs and slowly radiates the heat outward over a period of several hours at a relatively constant rate. A secondary burn chamber 102 ("oven") is typically located above the firebox 104 and fitted with a door for cooking, although the secondary burn chamber 102 is not necessary for a fully functional masonry heater 100. Masonry heater 100 may have varying shapes, including cylindrical, square, rectangular or tapered designs. Masonry heater 100 may also have smoke channels located between the firebox 104 and the chimney to further absorb and evenly distribute heat. As those of ordinary skill in the art will recognize, masonry heater 100 may come in varying shapes and sizes, and have additional design features not illustrated in FIG. 1 without departing from the description and illustrations contained herein.

Figure 2A:
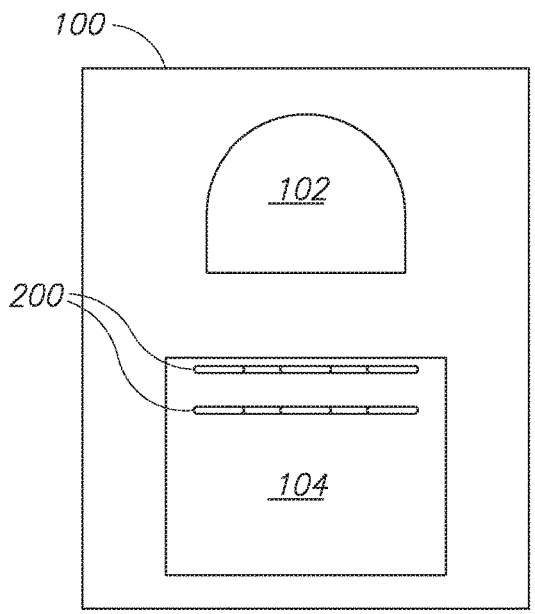
FIG. 2A illustrates a front view of a masonry heater with a coil pipe installed horizontally as part of the heat transfer apparatus.
Figure 2B:
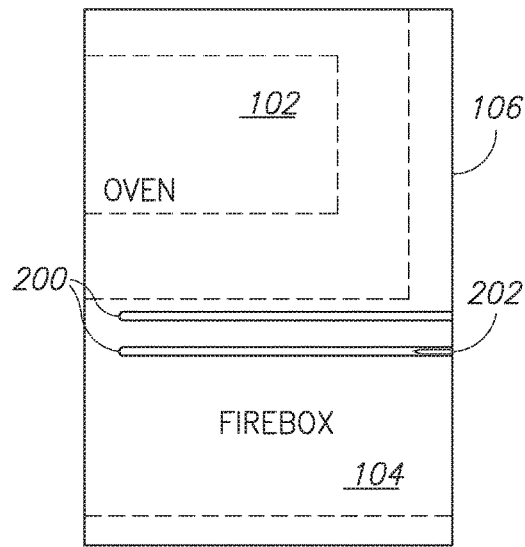
FIG. 2B illustrates a side view of the masonry heater of FIG. 2A.

FIGS. 2A and 2B illustrate an embodiment of a heat transfer apparatus where lengths of coil pipes 200 are disposed in the firebox 104 of a masonry heater 100. In this embodiment, the coil pipes 200 are oriented in a substantially horizontal manner near or at the top of the firebox 104. As shown in FIG. 2A, the coil pipes 200 extend across a substantial portion of the firebox 104 to increase the area of coil pipes 200 that are directly exposed to heat. The coil pipe 200 may be located farther down in the firebox 104 to the heat source; however, this may decrease the space available for placement of fuel and may not significantly increase performance of the heat transfer apparatus. FIG. 2B illustrates a side view of the horizontal orientation of the coil pipe, where the coil pipes 200 extend into the firebox 104, and a temperature sensor is located within the firebox 104 in a liquid return path of the coil pipes, as discussed later in more detail. Alternatively, the coil pipes 200 may extend from a side wall or other wall of the masonry heater 100, as long as heat from the firebox 104 intersects with the coil pipe 200 in a direction substantially orthogonal to the direction in which the coil pipes 200 extend. In FIGS. 2A and 2B, two coil pipes 200 are illustrated at the top of the firebox 104 to maximize the amount of heat and power captured and transferred from the firebox 104, however, a single coil pipe 200 or more than two coil pipes 200 may be installed in the firebox 104 without departing from the scope of the heat transfer apparatus or heat transfer system described herein.

Figure 2C:
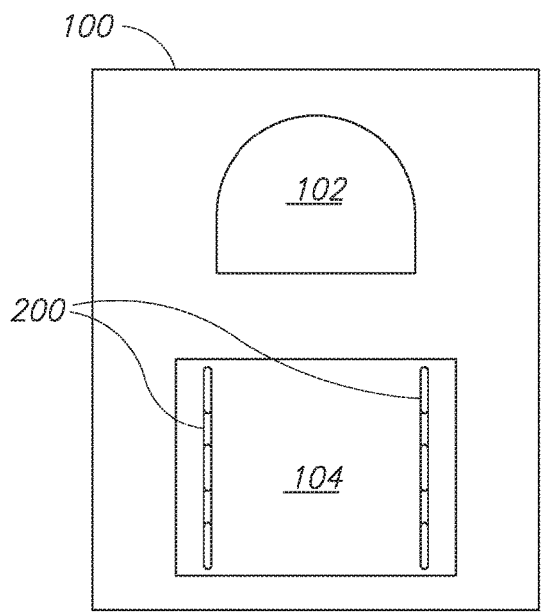
FIG. 2C illustrates a front view of a masonry heater with coil pipes installed vertically as parts of the heat transfer apparatus.
Figure 2D:
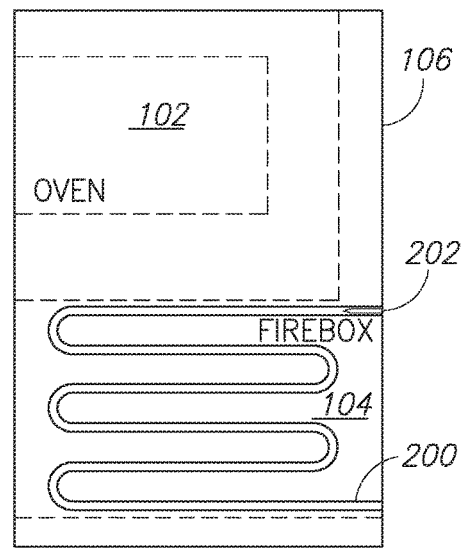
FIG. 2D illustrates a side view of the masonry heater of FIG. 2C.

FIGS. 2C and 2D illustrate an embodiment of a heat transfer apparatus where coil pipes 200 are oriented in a vertical manner in the firebox 104. Typically, the coil pipes 200 are installed adjacent to the sides of the firebox 104 in this configuration to allow access to the coil pipes 200 for maintenance, and to maximize the available space for stacking wood or other fuel. In this configuration, liquid enters the firebox 104 at the bottom end of the coil pipe 200 and exits the firebox 104 at the top end of the coil pipe, which promotes evacuation of any accumulation of gases in the heat transfer apparatus, as described later. As illustrated in FIG. 2D, a first temperature sensor 202 should be located within the firebox 104 in a liquid return path of the coil pipe 200 at the top end of the coil pipe. It is desirable that the first temperature sensor 202 extends through wall 106 and far enough into the firebox 104 to obtain an accurate measurement of the liquid at its hottest point, before the liquid exits the firebox 104 and begins to cool. A vertical orientation may be preferable to the substantially horizontal orientation where access to the interior of a masonry heater 100 is limited, or where such an orientation is preferable due to the type or style of masonry heater 100, such as a double bell masonry heater 100. It is important to orient the coils to permit access to the coil pipes 200 for maintenance and repair purposes. Although two coil pipes 200 are illustrated in FIG. 2C, any number of coil pipes 200 may be oriented in a vertical manner within the firebox 104 to achieve the desired amount of heat transfer.

The coil pipe 200 orientations shown in FIGS. 2A-2D promote maximum energy capture and transfer, but other orientations may achieve similar results. For example, two coil pipes 200 could be oriented in a vertical direction along a single wall of the masonry heater 100. Coil pipes 200 may also be located in other portions of the masonry heater 100, such as in a downdraft channel or in a secondary heating chamber 102 such as the oven, but such placements may not capture the same amount of heat and power per coil pipe 200 as coil pipes 200 placed in the firebox 104 of the masonry heater 100.

Figure 3:
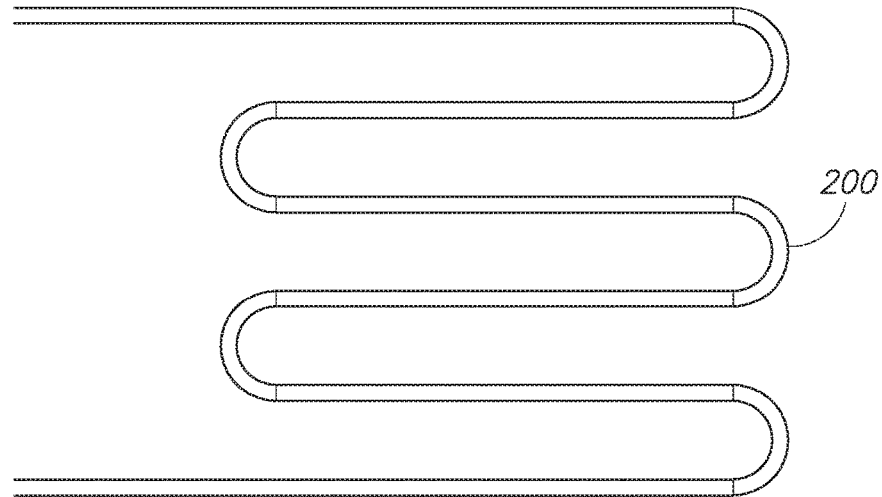
FIG. 3 illustrates a single coil pipe.

FIG. 3 shows a typical coil pipe 200 that is installed in the firebox 104 of a masonry heater 100, such as the firebox 104 illustrated in FIGS. 2A-2D. Water is typically used as the liquid in the coil pipes, but other liquids such as glycol may be used to achieve similar effects. Water is used to achieve uniformity in the masonry heater 100 (primary) side and the external heating device 208 (secondary) side. In a typical installation, the length that the coil pipe 200 extends into the firebox 104 is approximately 23.5 inches, while the coiled part of the pipe is approximately 18 inches of that length. The width of the coil pipe 200 in a horizontal direction of the masonry heater 100 is approximately 18 inches. The diameter of the coil pipe 200 is approximately 0.75 inches. The total length of a coil pipe 200 typically installed in a heat transfer apparatus is approximately 9 feet, which ensures that the liquid in the coil pipe 200 will have sufficient exposure to heat in the firebox 104 to maximize the temperature of the liquid without vaporizing the liquid. Where two coil pipes 200 are installed in the firebox 104 in a horizontal manner, as illustrated in FIGS. 2A and 2B, the total length of coil pipes 200 exposed to the heat of the firebox 104 is 18 feet.

The length of the coil pipe 200 exposed to heat is a critical factor to the overall efficiency and safety of the heat transfer apparatus. If the length of exposed coil pipe 200 is too short, the amount of power extracted from the masonry heater 100 is not maximized. On the other hand, if the length of exposed coil pipe 200 in the firebox 104 is too long, the liquid in the coil pipe 200 will vaporize which may damage the heat transfer apparatus or cause injury to the operator. The dimensions of the coil pipes 200 require only a small volume of liquid to achieve safe and efficient transfer of heat. Typically, only about one-quarter to one-third of a gallon of liquid is used in a two pipe coil system. In the event of failure due to power outage, a Temperature and Pressure relief valve (TxP valve 506) will dump liquid from the heat transfer apparatus through the drain 508 if the temperature and/or pressure of the liquid becomes too high, but it is preferable that only a small volume of liquid is contained in the system to prevent injury to persons or damage to the system. Stainless steel pipes are preferred for the coil pipes, which are fairly inexpensive, yet can withstand 250° F. temperatures and 10,000 pounds of pressure per square inch. Other materials may be used for the coil pipes, as long as the materials can similarly withstand high temperatures and pressures.

Figure 4:
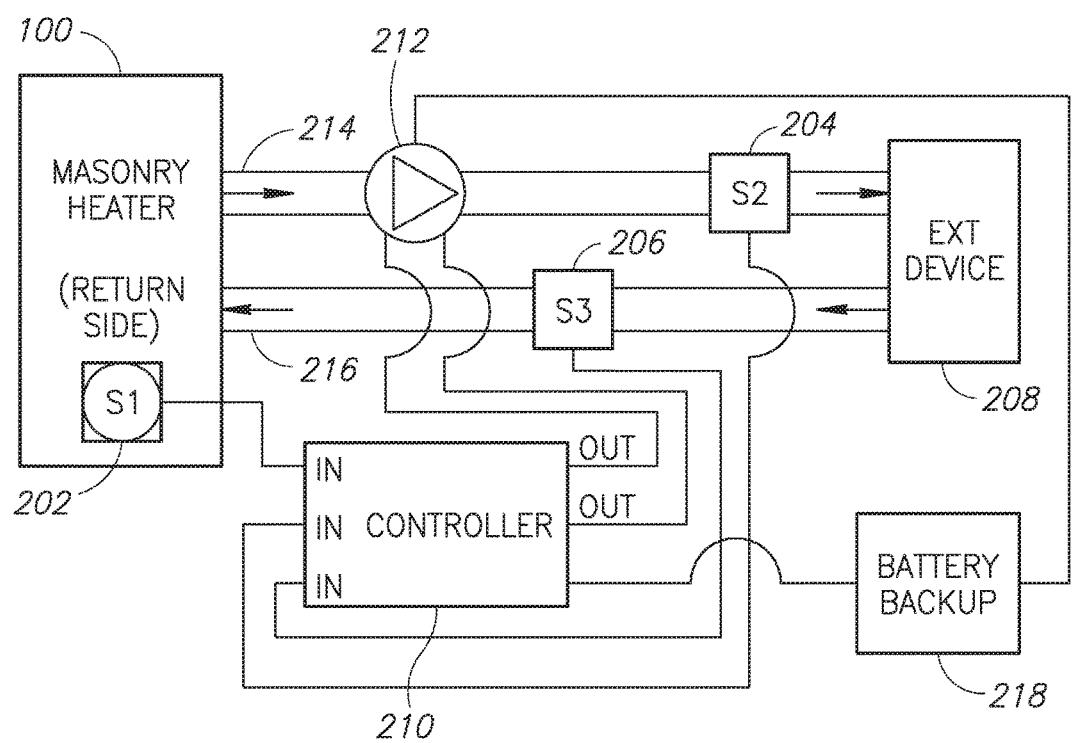
FIG. 4 illustrates a schematic view of a heat transfer apparatus and heat transfer system utilizing the present invention.

FIG. 4 depicts a schematic view of a portion of a heat transfer apparatus and a portion of a heat transfer system. Sensor S1 is the first temperature sensor 202 which extends within the firebox 104 in the coil pipe, and is connected to an input of a controller 210. A liquid circulation pump 212 circulates heated liquid from the coil pipe 200 in the masonry heater 100 to the external heating device 208 when the controller 210 detects that the temperature measured by the sensor S1 is equal to or greater than a predetermined temperature threshold. The predetermined temperature threshold should be approximately 150° F. The system will enter thermal runaway if the predetermined temperature threshold is set too high above 150° F. Conversely, if the predetermined temperature threshold is set below 150° F. by a significant amount, the liquid circulation pump 212 will continuously circulate the liquid after firing, needlessly wasting energy and increasing the cost of operation.

Temperature sensor S2 (204), which is connected to an input of the controller 210, detects a temperature of the liquid flowing to the external heating device 208 from the masonry heater 100 (on the return side 216 of the masonry heater 100). Temperature sensor S3 (206), which is also connected to an input of the controller 210, detects a temperature of liquid returning from the external heating device 208 to the masonry heater 100 (on the supply side 214 of the masonry heater 100). When the temperature measured by the sensor S1 exceeds the temperature threshold, the controller 210 directs the liquid circulation pump 212 to begin circulating the liquid and controls the flow rate of the liquid circulation pump 212 based on a difference between the temperatures measured by the sensors S2 and S3. The flow rate is adjusted to maintain a specified difference in temperature between sensors S2 and S3. For example, if the difference in temperature between sensors S2 and S3 is greater than the specified difference, indicating that the amount of heat being transferred to the external heating device 208 is too large, the controller 210 will increase the flow rate of the liquid circulation pump 212 to reduce the amount of heat transferred to the external heating device 208. If the measured difference in temperature is less than the specified difference, indicating that the amount of heat transferred to the external heating device 208 is too small, the controller 210 will decrease the flow rate of the liquid circulation pump 212 to increase the amount of heat transferred to the external heating device 208. If the difference in temperature is within a specified range of the specified temperature, the controller 210 will maintain the current flow rate of the liquid circulation pump 212. The specified temperature differential should be around 20° F. The specified range and specified temperature settings in the controller 210 may be adjusted by a user to accommodate the number of external heating device 208s and the type of external heating devices 208 connected to the heat transfer apparatus. Once the fuel in the masonry heater 100 is exhausted, the temperature of the liquid in the coil pipes 200 will lower and eventually the controller 210 will stop circulation of the liquid. The controller 210 may be a Johnson Controls A419ABC-1 (110 Volt AC), by way of non-limiting example. The operation of the controller 210 and the liquid circulation device are discussed in greater detail later.

Figure 5:
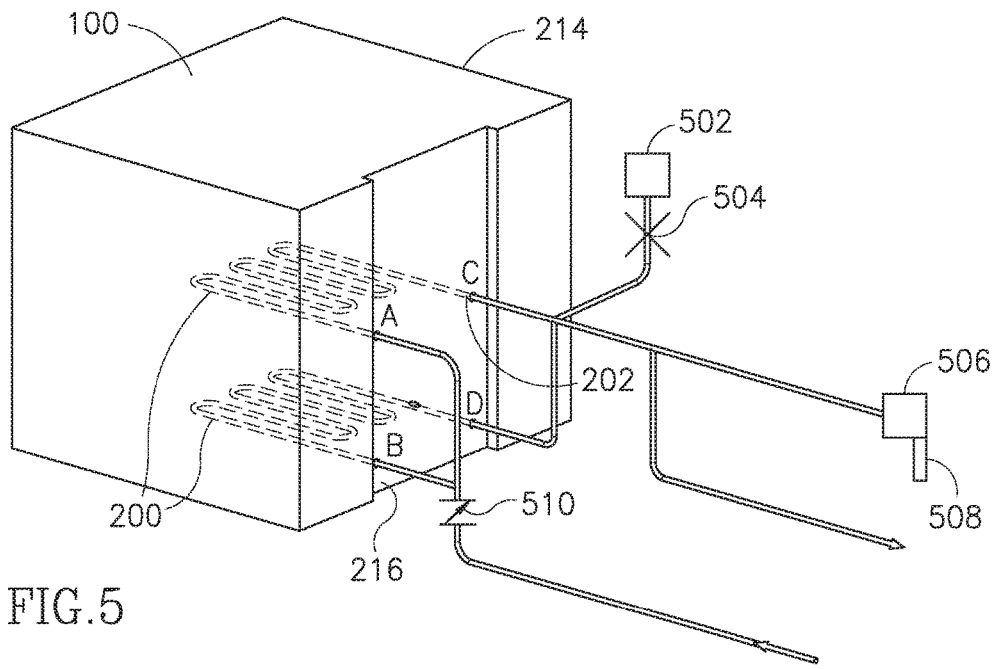
FIG. 5 illustrates a perspective view of FIGS. 2A-2B.

FIG. 5 illustrates a perspective view of two horizontally oriented coil pipes 200 connected together as in the embodiment of FIGS. 2A and 2B. When the liquid circulation pump 212 is off, the masonry heater 100 heats the liquid to a predetermined temperature, as detected by the first temperature sensor 202, at which point the controller 210 turns the liquid circulation pump 212 on and begins circulate the liquid to the external heating device 208. The tip of the first temperature sensor 202 should extend well into the masonry heater 100 to ensure that a proper temperature reading of the liquid returning from the masonry heater 100 is taken. If the first temperature sensor 202 does not properly extend into the firebox 104, the heat transfer system may enter thermal runaway potentially damaging the system. The first temperature sensor 202 is typically installed in a T-junction at an elbow joint and extending through aperture D at the return side 216 of the masonry heater 100 for ease of installation and maintenance. Alternatively, the first temperature sensor 202 may be installed in the liquid return path of the other coil pipe 200 through aperture C without affecting the performance of the heat transfer apparatus, but such an installation is not as easily implemented.

When the liquid circulation pump 212 is in a circulation mode, the heat transfer liquid enters the masonry heater 100 on supply side 216 through coil pipes 200 extending through apertures A and B. The heated liquid is then transferred from inside the masonry heater 100 through coil pipes 200 extending through apertures C and D, and back to the return side 216, where the heated liquid then flows back to the liquid circulation pump 212. As discussed later, an auto-vent valve 502 and TxP valve 506 may be located on the return side 216.

Figure 6:
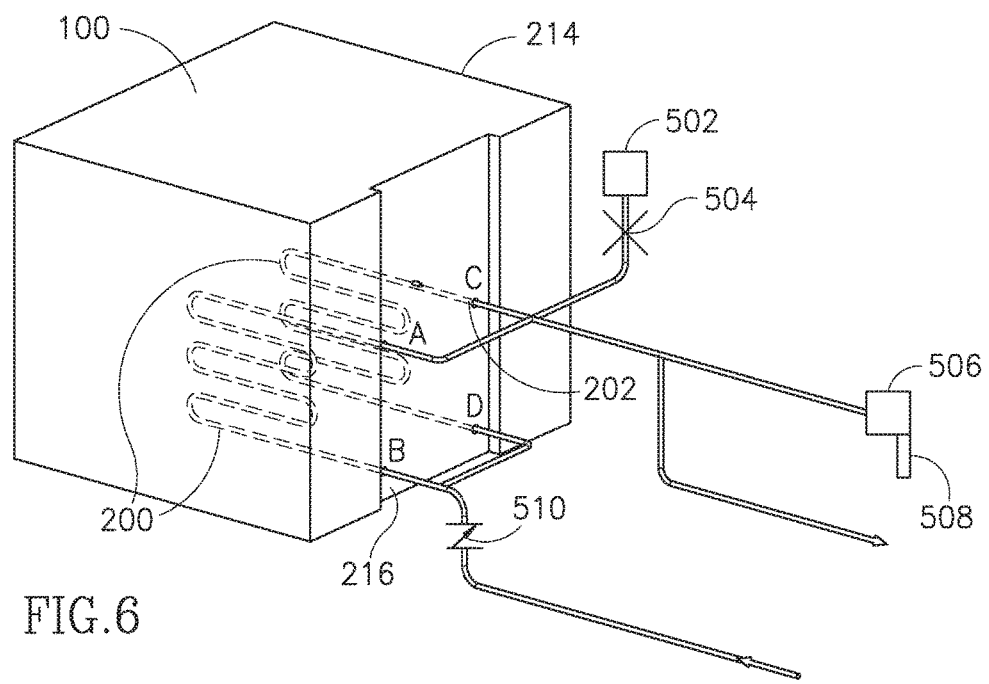
FIG. 6 illustrates a perspective view of FIGS. 2C-2D.

FIG. 6 shows a perspective view of two vertically oriented coil pipes 200 connected together as in the embodiment of FIGS. 2C and 2D. The system works essentially the same as the embodiment shown in FIG. 5, except that the supply side 214 is located on the bottom side of the masonry heater 100, rather than on a left or right side of the masonry heater 100. In this configuration, it is desirable to have the tip of the first temperature sensor 202 extend in a liquid return path of the coil pipe 200 closest to the liquid circulation pump 212. As with the configuration of FIG. 5, the first temperature sensor 202 is preferably installed in the elbow joint on the return side 216 of the masonry heater 100.

Figure 7A:
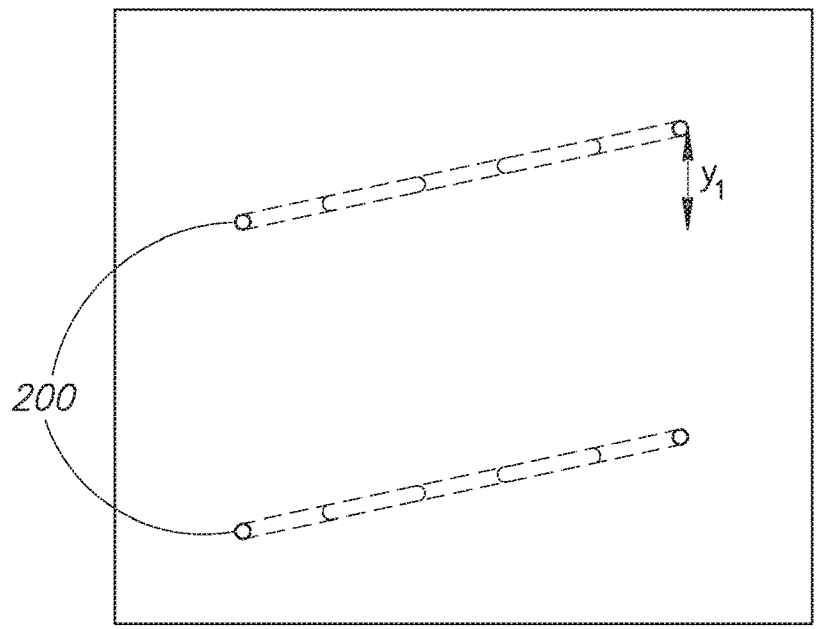
FIG. 7A illustrates the back of a masonry heater of FIGS. 2A-2B.
Figure 7B:
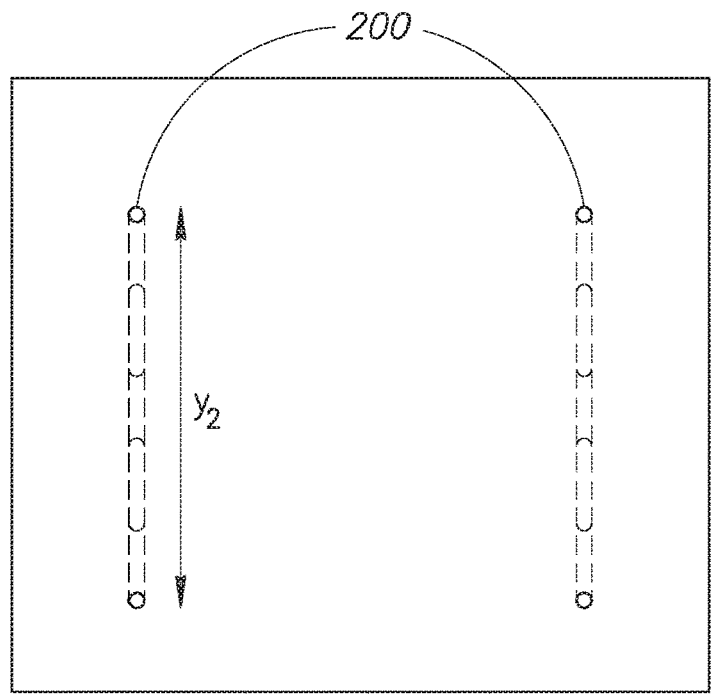
FIG. 7B illustrates the back of a masonry heater of FIGS. 2C-2D.

In FIGS. 7A and 7B, the back of the masonry heater 100 is illustrated. FIG. 7A corresponds to the coil pipe 200 configuration of FIG. 5, where the coil pipes 200 are substantially horizontally oriented. When the coil pipes 200 are substantially horizontally oriented, the supply side 214 of the coil should be located sufficiently lower than the return side 216 of the coil pipes 200 to ensure that any gas trapped in the coil pipe 200 rises to the return side 216, and is purged by the auto-vent valve 502, as described later. The rise $y_1$ of the coil pipes 200 in the vertical direction is not particularly limited, but the rise in typical installations is around 2 inches to ensure proper evacuation of gas from the lines. FIG. 7B corresponds to the coil pipe 200 configuration of FIG. 6, where the coil pipes 200 are vertically oriented.

Figure 8:
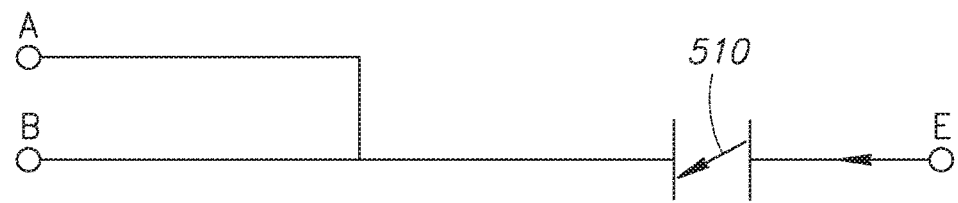
FIG. 8 illustrates a schematic view of the supply side of a heat transfer apparatus or heat transfer system.

FIG. 8 illustrates the supply side 214 of a heat transfer apparatus and system according to either of FIG. 5 or FIG. 6. As discussed earlier, when the liquid circulation pump 212 is operating, liquid is pumped from an external heating device 208 back toward the masonry heater 100 where it passes through a check valve 510. Check valve 510 allows the liquid to flow in only one direction toward the masonry heater 100. Installing a check valve 510 in this way serves two functions: first, it ensures a faster response time when the masonry heater 100 is heating up by preventing the expanding liquid from back-flowing to the supply side 214 of the masonry heater 100. Second, on failure, the check valve 510 allows in a small amount of cooler water to cool the coil pipe. A swing check valve 510 is preferred as check valve 510, but a ball check valve 510, lift check valve 510, diaphragm check valve 510 or other style check valve 510 may be used instead. A check valve 510 should be selected having a size sufficient to support the flow of liquid through the system, and that can also withstand the temperature of the liquid. The liquid flows from the check valve 510 to the supply side 214 of the coil pipe 200 where the liquid enters the coil pipe 200 and the masonry heater 100. FIG. 8 illustrates that the supply side 214 feeds two coil pipes, however, the supply side 214 may feed only one coil pipe 200 or more than two coil pipes 200 without departing from the scope of the heat transfer apparatus and system described herein.

Figure 9:
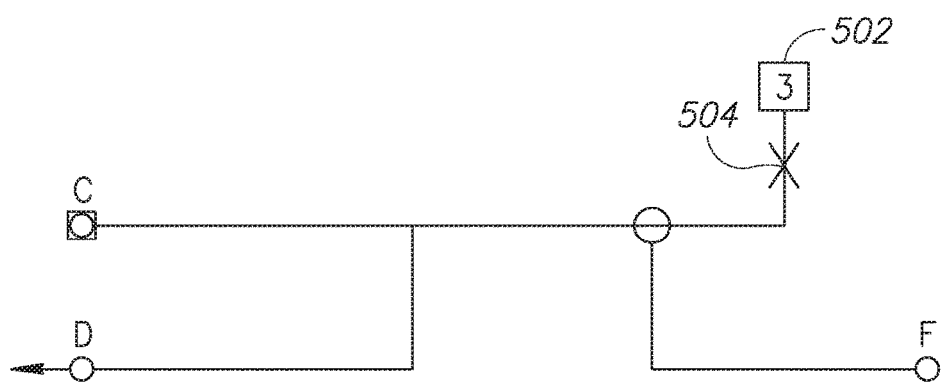
FIG. 9 illustrates a schematic view of the return side of a heat transfer apparatus or heat transfer system.

FIG. 9 illustrates the return side 216 of a heat transfer apparatus or heat transfer system according to either of FIG. 5 and FIG. 6. When the liquid circulation pump 212 is operating, liquid is pumped from the coil pipes 200 inside of the masonry heater 100 toward the external heating device 208. The return side 216 may also include a hi-point auto-vent valve 502 and/or TxP valve 506. The auto-vent valve 502 automatically purges any gas stuck in the lines from the system. The auto-vent valve 502 may be a Maid-O'-Mist® 670, by way of non-limiting example. A ball valve 504 may be located between the return side 216 of the coil pipe 200 and the auto-vent valve 502 to facilitate the replacement of the auto-vent valve 502 without draining liquid from the pipes. The TxP valve 506 purges liquid from the system if the temperature of the liquid exceeds a predetermined temperature or if the pressure in the lines exceeds a predetermined pressure. It is important to match the temperature and/or pressure characteristics of the TxP valve 506 with the characteristics of the external heating device 208. For example, when the heat transfer system transfers heat to a domestic water system having a hot water heater, if the pressure in the lines exceeds 75 pounds per square inch (PSI), the TxP valve 506 will drain liquid from the system until the pressure is reduced to less than 75 PSI. When the heat transfer system transfers heat to a hydronic heating system, where liquid is circulated through tubing to radiate heat, the TxP valve 506 should drain liquid from the system if the pressure exceeds 30 PSI. The TxP valve 506 purges liquid from the system into a drain line so that the liquid will be cleanly and safely removed. As a non-limiting example, the TxP valve 506 may be a Zurn® P10000HXL-150C when the external heating device 208 is a hot-water heater. When the external heating device 208 is a boiler, an Apollo 10-408 valve may be used.

Figure 10:
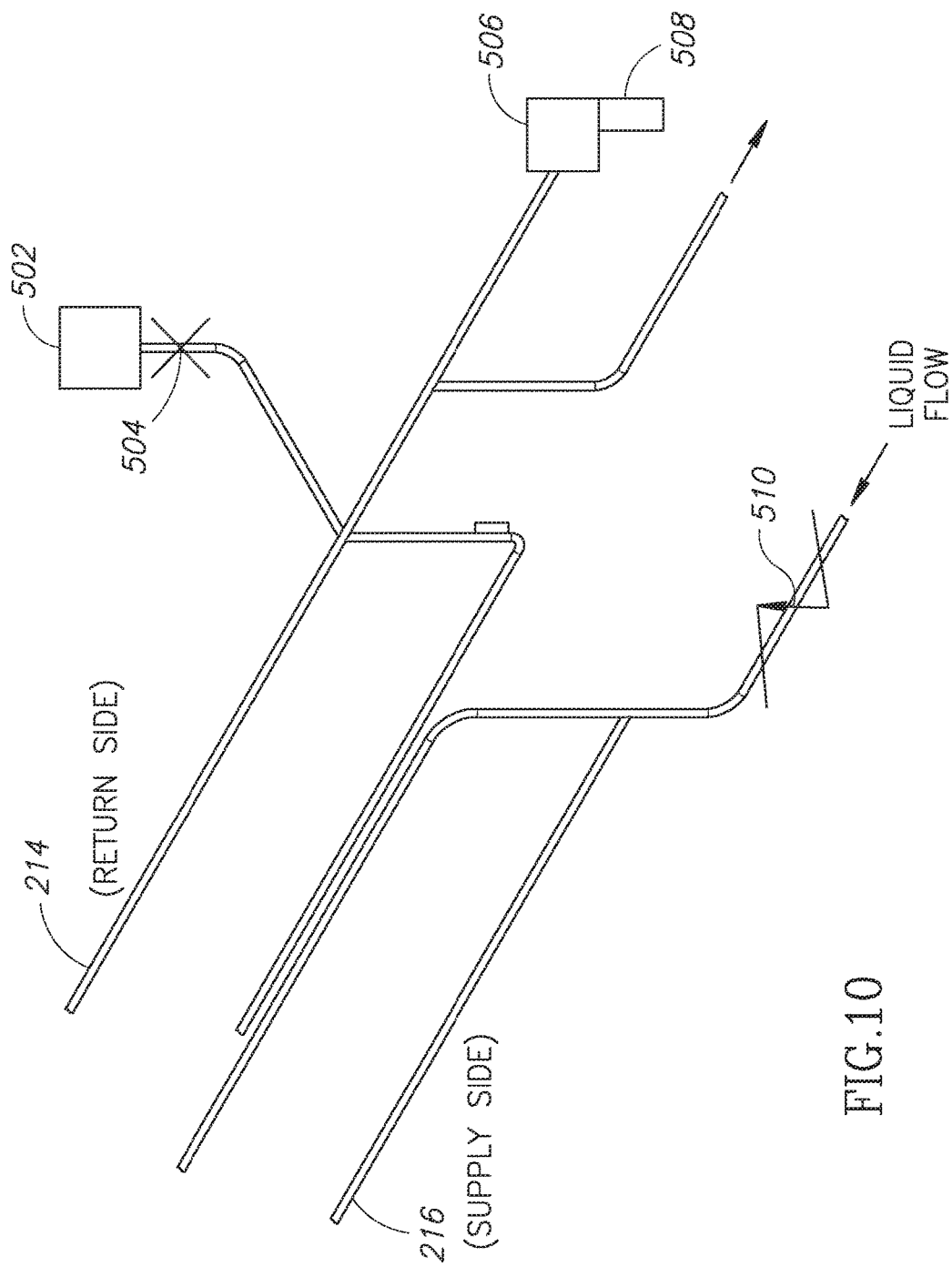
FIG. 10 illustrates a perspective view of the supply and return sides of a heat transfer apparatus or heat transfer system.

A perspective view of the supply side 214 and return side 216 is shown in FIG. 10. As previously described, check valve 510 is located on the supply side 214 before the supply side 214 forks into separate pipes. On the return side 216, the auto-vent valve 502 and ball valve 504 are located at the hi-point of the line. The TxP valve 506 and drain may also be located on the top part of the return side 216. A T-junction is located on the return side 216 at an end of a pipe extending from the masonry heater 100. A first port of the T-junction is connected to the pipe extending from the masonry heater 100, and a second port at a 90 degree angle from the first port is connected to piping on the return side 216 of the system. At a third port of the T-junction, a sensor sheath housing a first temperature sensor 202 is inserted which should extend from the T-junction and into the coil pipe 200 within the masonry heater 100 to assure accurate temperature measurement of the liquid at or near its hottest point in the masonry heater 100.

Figure 11:
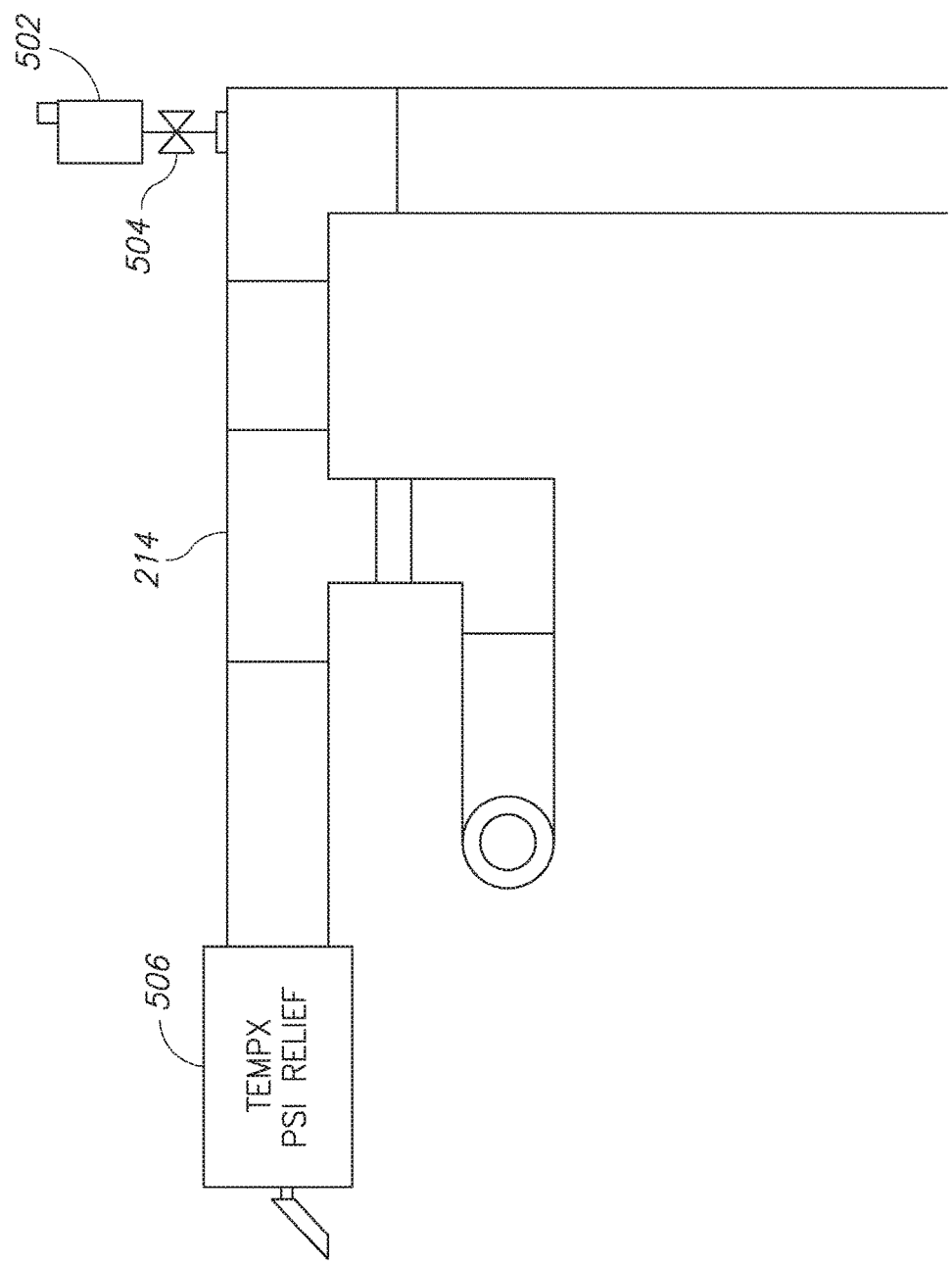
FIG. 11 illustrates a side view of the return side of a heat transfer apparatus or heat transfer system.

FIG. 11 shows a sectional view of the return side 216 of the heat transfer apparatus. The TxP valve 506 and auto-vent valve 502 are located on a top portion of the return side 216. Piping extends in a direction orthogonal to the top portion to extend into the masonry heater 100. The T-junction is located on the bottom portion in FIG. 11, and the first port and third port extend coaxially, while the second port extends in a direction orthogonal to the first and the third port. The liquid returning from the coil pipe 200 within the masonry heater 100 travels through both the top portion and a lower portion, past the auto-vent valve 502, and to the masonry heater 100 and liquid circulation pump 212.

Figure 12:
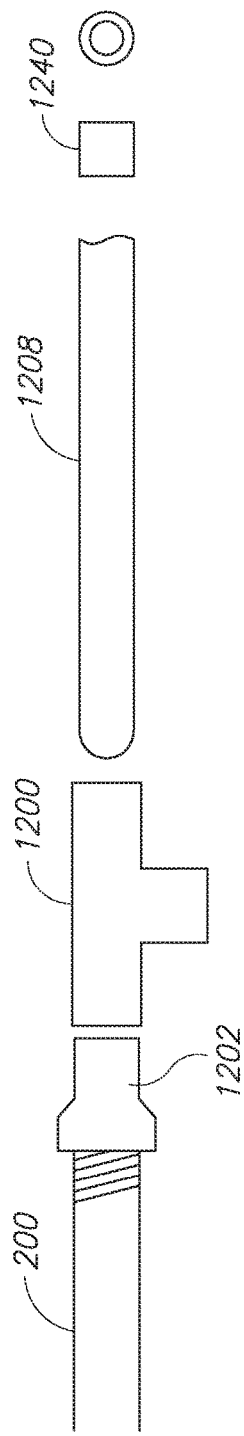
FIG. 12 illustrates an exploded view of a temperature sensor, a T-junction, and a coil pipe shown assembled in FIG. 13.

Referring to FIG. 12, a threaded pipe is screwed into a fitting 1202, which is then inserted and bonded in the third port of the T-junction 1200. A sensor sheath 1208 housing the first temperature sensor S1 is inserted in the first port of the T-junction 1200. The first temperature sensor 202 should be located as close to the tip of the sensor sheath 1208 as possible. A flush bushing 1204 is installed at the base of the sensor sheath 1208 to seal the T-junction 1200. The sensor sheath 1208 should be long enough to extend through the wall of the masonry heater 100 and into the firebox 104. When the liquid circulation pump 212 is operating, liquid flows from the coil pipe 200 inside the masonry heater 100 around the sensor sheath 1208 in a liquid return path of the coil pipe, and out of the second port of the T-junction 1200 toward the external heating device 208. In typical installations, the threaded pipe, the fitting, and the T-junction are 0.75 inches in diameter, whereas the sensor sheath 1208 is slightly smaller at about 0.5 inches in diameter to allow flow of the liquid in the return path of the coil pipe.

Figure 13:
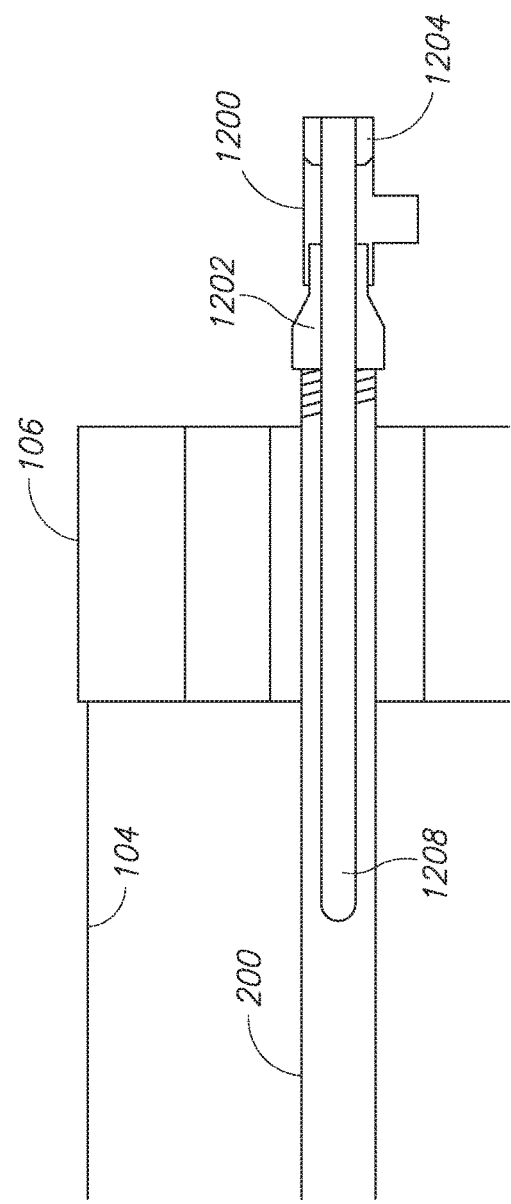
FIG. 13 illustrates a temperature sensor disposed in the coil pipe within the firebox of a masonry heater.

FIG. 13 illustrates how the T-junction 1200, coil pipe 200, fitting 1204, and sensor sheath 1208 appear in a sectional view on the return side 216 when assembled. The coil pipe 200 extends from the fitting 1204, through the wall of the masonry heater 100, and into the firebox 104, where the coil pipe 200 winds back and forth to be exposed to direct heat and flames in the firebox 104. The sensor sheath 1208, which houses the first temperature sensor 202, extends from the first port of the T-junction 1200, through the T-junction 1200, and into the coil pipe 200. The sensor sheath 1208 and the first temperature sensor 202 further extend through a wall of the masonry heater 100 and into the firebox 104. In FIG. 13, a 12-inch sensor sheath is illustrated, which extends through a 4.5 inch wall 106 of the masonry heater 100, and 3-4 inches of the sensor sheath extend into the firebox 104 so that the sensor S1 is exposed to liquid at or near its hottest point in the firebox 104.

Referring back to FIG. 4, sensor S1 (in the sensor sheath 1208) is connected to an input of a controller 210. The controller 210 may be a Johnson Controls model A419ABC-1, by way of non-limiting example. The controller 210 may be programmed to turn the liquid circulation pump 212 on/off based on the temperature measured by the sensor S1 in the firebox 104. When the controller 210 operates the liquid circulation pump 212 to circulate the liquid, the controller 210 varies the flow rate of the liquid circulation pump 212 based on how much heat is transferred to the external heating device 208. Specifically and as described above, a sensor S2 on the return side 216 of the coil pipes 200 measures the temperature of the heated liquid being supplied to the external heating device 208. Sensor S3 on the supply side 214 of the coil pipes 200 measures the temperature of the heated liquid returning from the external heating device 208. The controller 210 determines a difference between the temperatures measured by the sensors S2 and S3, and adjusts the flow rate of the liquid circulation pump 212 based on the measured temperature difference between sensors S2 and S3 to achieve a target temperature difference. In one application described later, the target temperature difference may be 20° F. The target temperature difference is the amount of heat transferred from the masonry heater 100 to the external heating device 208. Placing the sensors S2 and S3 close to the output of the heat transfer apparatus, and close to the external heating device 208, enables an accurate measurement of the heat actually transferred to the external heating device 208. On the other hand, if the sensors S2 and S3 were placed closer to the masonry heater 100, the measured temperature difference would also measure the amount of heat lost in the piping between the masonry heater 100 and the external heating device 208, leading to an inaccurate measurement of how much heat is actually transferred to the external heating device 208. Although the liquid circulation pump 212 is disposed on the return side 216 of the coil pipes 200 in FIG. 4, the liquid circulation pump 212 may be placed on the supply side 214 of the coil pipes 200 without adversely affecting the performance of the heat transfer apparatus. In a power outage, the masonry heater 100 will continue to heat the liquid while the liquid circulation pump 212 cannot transfer heat. The TxP valve 506 will prevent the liquid in the heat transfer apparatus from vaporizing and damaging the piping during a power outage. A battery back-up 218 may be installed on the controller 210 and the liquid circulation pump 212 to properly circulate the heated liquid and prevent the TxP valve 506 from purging liquid from the system during a power outage. A battery back-up 218 (not illustrated) may also be installed on the secondary side of the external heating device 208 to allow the system to properly dump heat in the event of a power outage.

Figure 14:
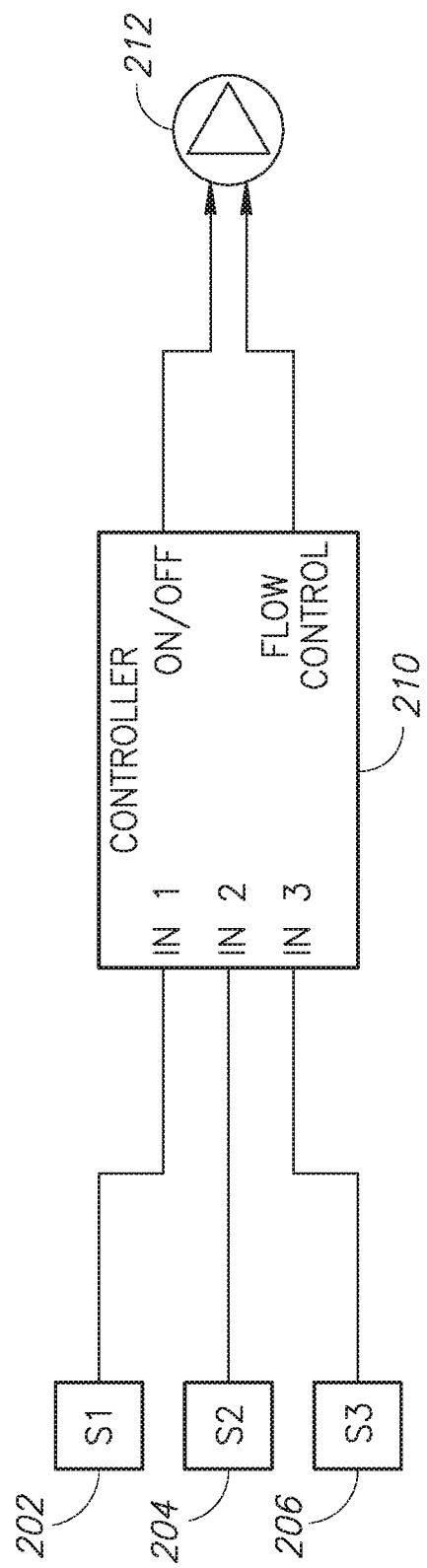
FIG. 14 illustrates the electrical connections of sensors to a controller that is connected to a liquid circulation pump.

FIG. 14 illustrates the electrical connections of the controller 210. Sensor S1 is connected to input In1 of the controller 210, while sensors S2 and S3 are connected to inputs In2 and In3, respectively, of the controller 210. The controller 210 reads a temperature from sensor S1 and, based on whether the temperature is equal to or greater than a predetermined temperature threshold, controls whether the liquid circulation pump 212 circulates liquid through the system. An output of the controller 210 is connected to the liquid circulation pump 212, either directly or through an intermediate device. The controller 210 may be configured to output a digital HI/LO signal directing the liquid circulation pump 212 to circulate liquid. Alternatively, the controller 210 may be configured to generate an analog signal (e.g., 24V AC signal at 60 Hz) directing the liquid circulation pump 212 to circulate liquid. An intermediate device (not illustrated) may be used which generates a specified analog signal when the HI/LO output of the controller 210 outputs a HI digital signal. For example, the controller 210 may output a +5V digital signal to a D/A converter, which outputs a 24V AC signal to the liquid circulation pump 212, causing the liquid circulation pump 212 to circulate liquid through the system. These examples are intended to be non-limiting descriptions of the myriad ways in which the controller 210 may control the liquid circulation pump 212.

The controller 210 may also determine the difference between the sensors S2 and S3 and output a signal directing the liquid circulation pump 212 to circulate liquid at a particular flow rate based on the measured difference. Alternatively, sensors S2 and S3 may be connected directly to the liquid circulation pump 212, which may be configured to control the flow rate based on the temperature difference measured between sensors S2 and S3. The liquid circulation pump 212 may be a Taco variable speed delta-T 00® circulator or a Taco HEC-2 BumbleBee®, by way of non-limiting example.

Referring to FIG. 15, the external heating device 208 may be a boiler 1500 in which a liquid is heated or vaporized. The controller 210 and/or liquid circulation pump 212 are configured to transfer a given amount of heat to the boiler 1500 based on the heat required by the boiler 1500 to operate.

Figure 16A:
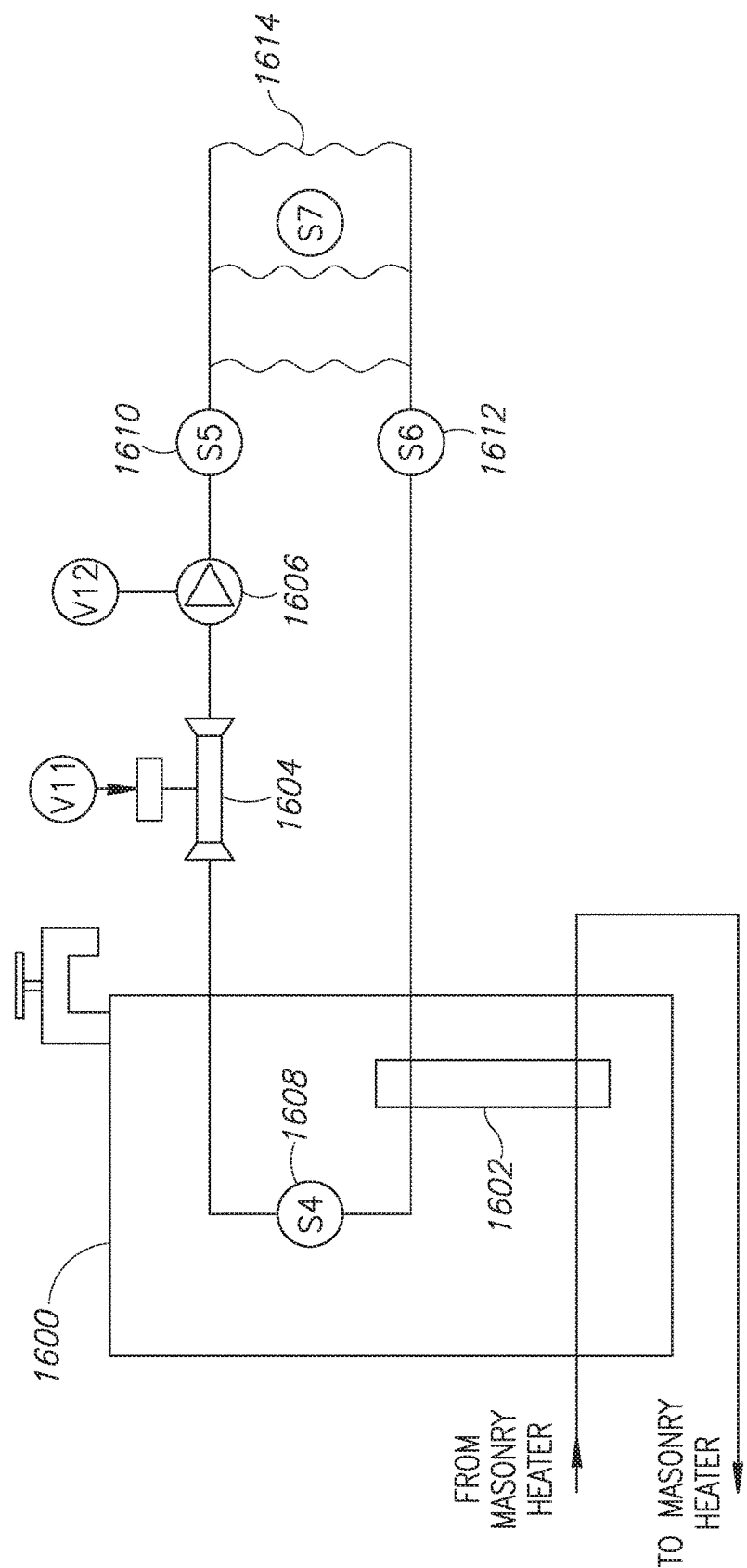
FIG. 16A illustrates a liquid heater and thermal dump apparatus connected to a heat transfer apparatus.

Referring to FIG. 16A, the external heating device 208 may be a liquid heater 1600, such as a hot-water heater. The heated liquid from the masonry heater 100 is circulated into the liquid heater 1600, where the heated liquid flows over a plate heat exchanger 1602. The plate heat exchanger 1602 transfers heat from the heated liquid to a secondary liquid, which may be water or glycol, for example. The secondary liquid may be used as domestic heated water and may be used to provide radiant heat to a building. The radiant zone 1614 and associated devices function as an over-heat thermal dump apparatus, which dumps heat from the masonry heater and liquid heater 1600 when the temperature of the heated liquid is too high. Because masonry heaters 100 generate very large amounts of heat, it is sometimes necessary to dump excess heat from the system to prevent vaporization of liquid in the system or damage to the system. The radiant zone 1614 may be installed in a room or several rooms to provide heat thereto. The radiant zone 1614 may also be installed in a cooler area of a building, such as a garage, where heat may be more rapidly dumped than an interior room of a building. The liquid heater 1600 in FIG. 16A may be an HTP Versa-Hydro Combination Hydronic Appliance, by way of non-limiting example.

Radiant heat zone 1614 radiates heat from heated liquid to an area in a house or building. Zone valve 1604 opens and closes to allow liquid to flow from the liquid heater 1600 to radiant zone 1614 when a predetermined control signal is received on control line V11. Liquid circulation pump 1606 controls the flow rate of the liquid flowing from the liquid heater to the radiant zone 1614 based on the control signal received on control line V12. Although zone valve 1604 and liquid circulation pump 1606 are both illustrated in FIG. 16A, it may be necessary to use only one or the other depending on the type of system. Temperature sensor S4 1608 measures the temperature $T_4$ of the liquid in the liquid heater 1600. Temperature sensor S5 1610 and temperature sensor S6 1612 measure the temperature of the liquid flowing to and from the radiant heat zone 1614, respectively. Temperature sensor S7 1613 measures the ambient air temperature of the area in which the radiant heat zone 1614 is installed. Although only a single radiant heat zone 1614 is illustrated in FIG. 16A, more than one radiant heat zone may be connected to the liquid heater 1600 to selectively radiate heated liquid distributed from liquid heater 1600. The radiant heat zones are typically connected in parallel to the liquid heater 1600, but may be connected in series depending on installation demands, such as the building layout. A thermostat (not shown) controls each radiant heat zone.

Figure 16B:
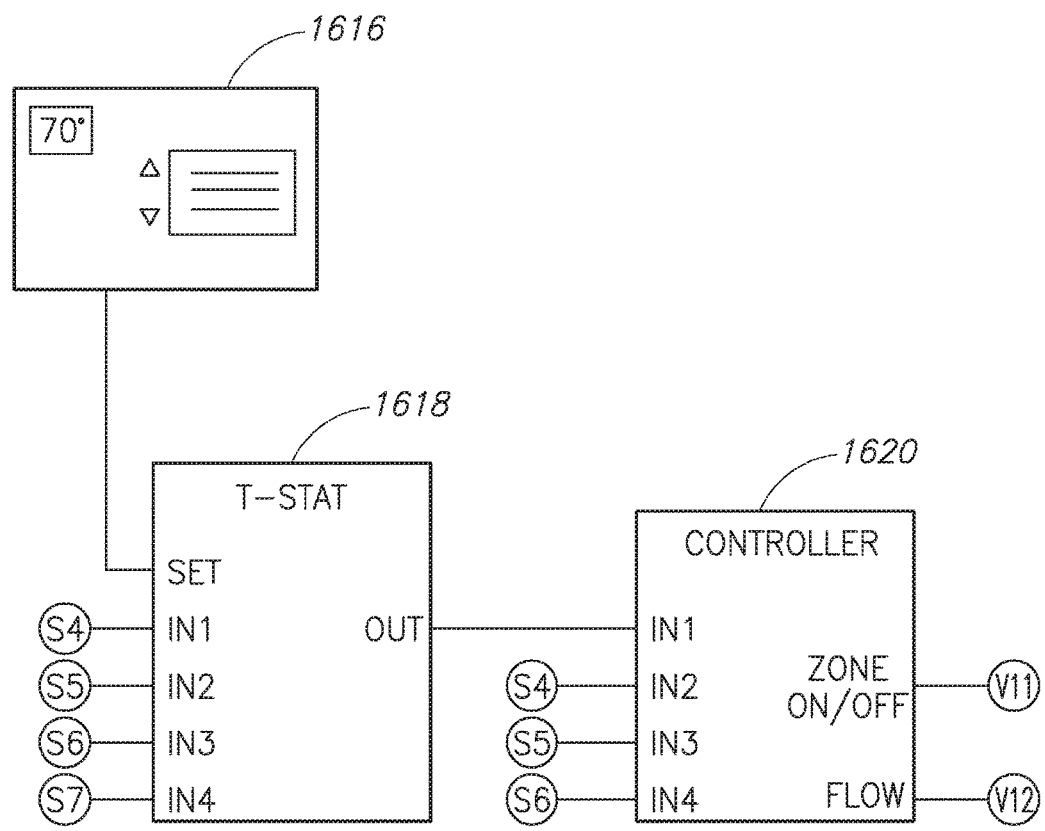
FIG. 16B illustrates a control diagram for a single radiant heat zone in a thermal dump apparatus.

FIG. 16B illustrates the control configuration of a single radiant heat zone. A user can set the temperature for the area corresponding to the radiant heat zone 1614 using control panel 1616. The thermostat 1618 receives the desired temperature setting from the control panel 1616 and the ambient air temperature measured by sensor S7. Thermostat 1618 may read the temperature $T_4$ of the heated second liquid from the sensor S4 in the liquid heater to better control the amount of heat radiated from the radiant heat zone 1614, although it is not necessary for the thermostat 1618 to monitor the sensor S4. Thermostat 1618 may also measure the temperature differential ($T_5-T_6$) between sensors S5 and S6 to measure the amount of heat actually radiated from the radiant heat zone 1614. Sensors S5 and S6 should be placed as close to the radiant heat zone 1614 to accurately measure the amount of heat actually transferred to and radiated from the radiant heat zone 1614. The thermostat 1618 generates a control signal containing information including whether the zone valve 1604 should be open or closed, and/or the flow rate of the liquid circulation pump 1606 based on the temperatures measured by sensors S4, S5, S6, and/or S7, as well as the desired temperature setting from the control panel 1616. The controller 1620 acts as a relay bypass to bypass the thermostat 1618 control when the temperature of the liquid in the liquid heater 1600 exceeds a predetermined temperature threshold. In this configuration, control of the radiant heat zones is achieved electrically, without the need to divert the heated liquid to a different channel or radiant zone. The controller 1620 may be configured operate the zone valve 1604 and/or liquid circulation pump 1606 to dump heat between 160° F. and 180° F., well-before the liquid is vaporized.

The controller 1620 outputs a zone valve control signal and/or a circulation pump control signal based on the control signal received from the thermostat 1618. The controller 1620 may be configured to generate the zone valve control signal and/or the circulation pump control signal based on a control signal sent from the thermostat 1618, which includes the desired temperature setting and the temperature measured by sensor S7 near the radiant heat zone 1614. When the controller 1620 determines that the temperature $T_4$ measured by sensor S4 exceeds the predetermined temperature, the controller 1620 bypasses the control signal sent from the thermostat and begins dumping heat from the liquid heater 1600 to the radiant heat zone 1614. That is, the controller 1620 enters a relay bypass mode in which heat is dumped from the liquid heater 1600 to the radiant heat zone to prevent thermal runaway when the controller 1620 determines that the temperature measured by sensor S4 exceeds the predetermined temperature. In the relay bypass mode, the controller 1620 controls the zone valve 1604 and/or the liquid circulation pump 1606 independently of the thermostat 1618 and the desired temperature setting until the radiant heat zone 1614 dumps enough heat from the liquid heater 1600 to ensure that the system is not in danger of entering thermal runaway. The controller 1620 may adjust the flow rate of the circulation pump 1606 based on the temperature differential $(T_5-T_6)$ of the temperatures measured by sensors S5 and S6 to dump enough heat to efficiently and effectively reduce the temperature of the heated liquid in the liquid heater. The controller 1620 will continue to monitor the temperature $T_4$ measured by the sensor S4 and operate in the relay bypass mode until the temperature $T_4$ measured by the sensor S4 is less than the predetermined temperature. Once the temperature $T_4$ returns to an acceptable level, the controller 1620 returns to a normal operating mode wherein the controller outputs a zone valve control signal and/or a circulation pump control signal based on a control signal supplied by the thermostat 1618.

Figure 16C:
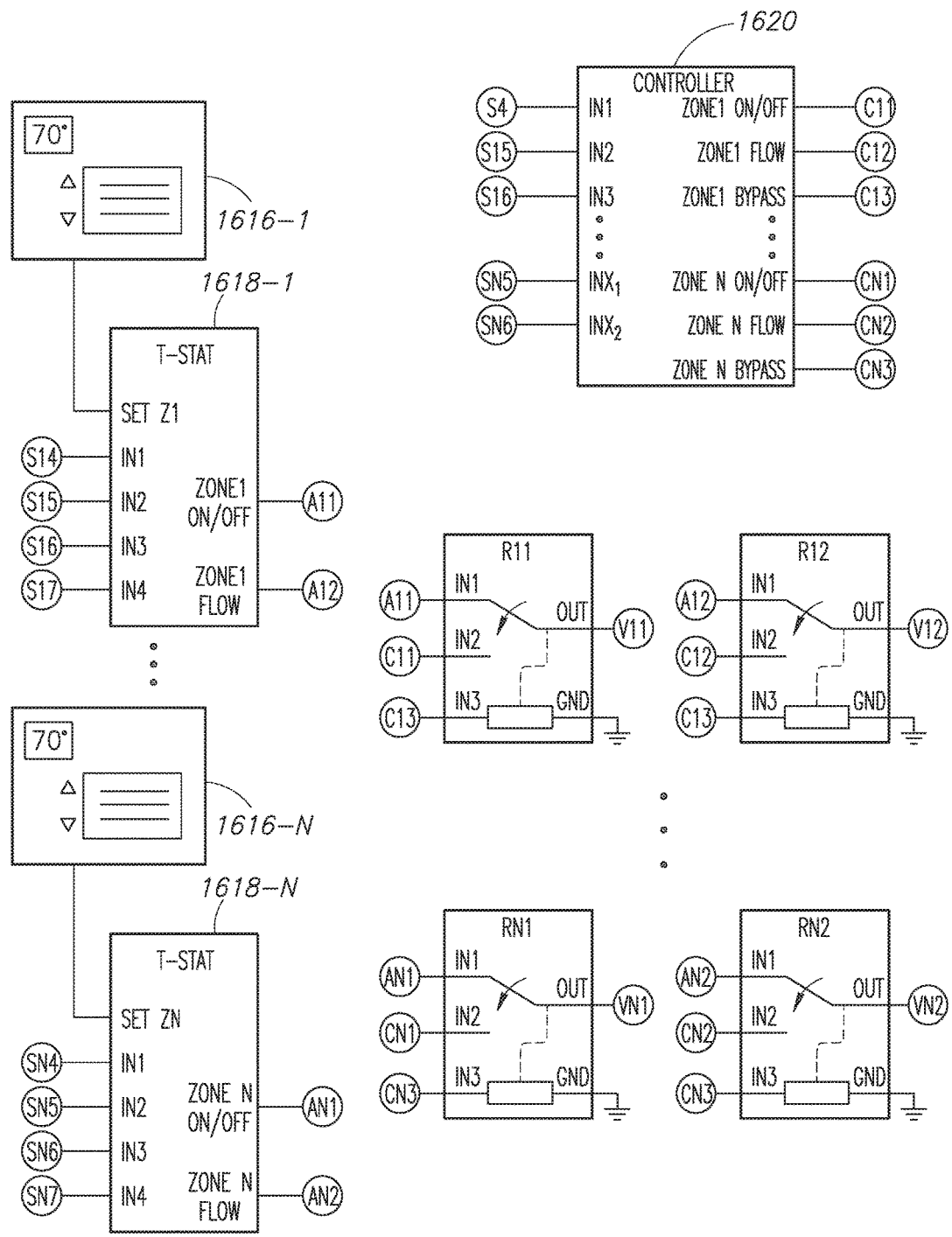
FIG. 16C illustrates a control diagram for more than one radiant heat zones in a thermal dump apparatus.

When multiple radiant heat zones 1614 are connected to the liquid heater 1600, thermal dump control is separately performed for each zone. The control configuration for multiple radiant heat zones is illustrated in FIG. 16C. As previously discussed, the radiant heat zones are typically connected in parallel to the liquid heater 1600, but may be connected in series depending on the building in which the system is installed. Each radiant heat zone may be a different size and therefore may each radiate and dump heat at different rates and may each comprise the elements illustrated in FIG. 16A. Each radiant heat zone has a corresponding control panel 1616-N and thermostat 1618-N, where N is an integer ranging from 1 to the total number of radiant heat zones installed in the system. A relay bypass RN1, RN2 is installed for each zone valve 1604 and circulation pump 1606, respectively. The relay bypasses RN1, RN2 isolate the thermostats of each zone from one another. Relay bypass R11 has a first input connected to the Zone 1 ON/OFF signal of thermostat 1618-1, a second input connected to the Zone 1 ON/OFF signal of controller 1620, and a third input connected to the Zone 1 Bypass signal of controller 1620. Relay bypass R12 has a first input connected to the Zone 1 flow rate signal of thermostat 1618-1, a second input connected to the Zone 1 flow rate signal of controller 1620, and a third input connected to the Zone 1 Bypass signal of controller 1620. Every relay bypass RN1, RN2 is connected in a similar manner as R11 and R12, respectively.

When the controller 1620 determines that the temperature $T_4$ measured by sensor S4 exceeds the predetermined temperature, the controller selects one or more of the radiant heat zones to bypass. The controller 1620 is configured to separately and selectively bypass the thermostat 1618-N of each zone and select which radiant heat zone to control. The controller 1620 may select radiant heat zones based on the rate at which the temperature $T_4$ measured by sensor S4 is increasing or the rate at which each zone is capable of dumping heat. The controller 1620 sends a relay bypass signal to the relay bypass RN1, RN2 of the selected zone(s), causing the selected relay bypass RN1, RN2 to output a signal from the controller 1620 instead of the corresponding thermostat 1618-N. For example, the relay bypasses R11 and R12 of zone 1 normally output the zone 1 ON/OFF signal and zone 1 flow rate signal, respectively, from thermostat 1618-1. When the controller 1620 determines temperature $T_4$ exceeds the predetermined temperature and selects zone 1 to bypass, controller 1620 outputs a bypass control signal to relay bypass R11 and R12, causing relay bypass R11 and R12 to output control signals from the controller 1620 instead of the thermostat 1618-1. The controller 1620 may bypass and control the other thermal dump zones in a manner similar to zone 1.

Figure 17:
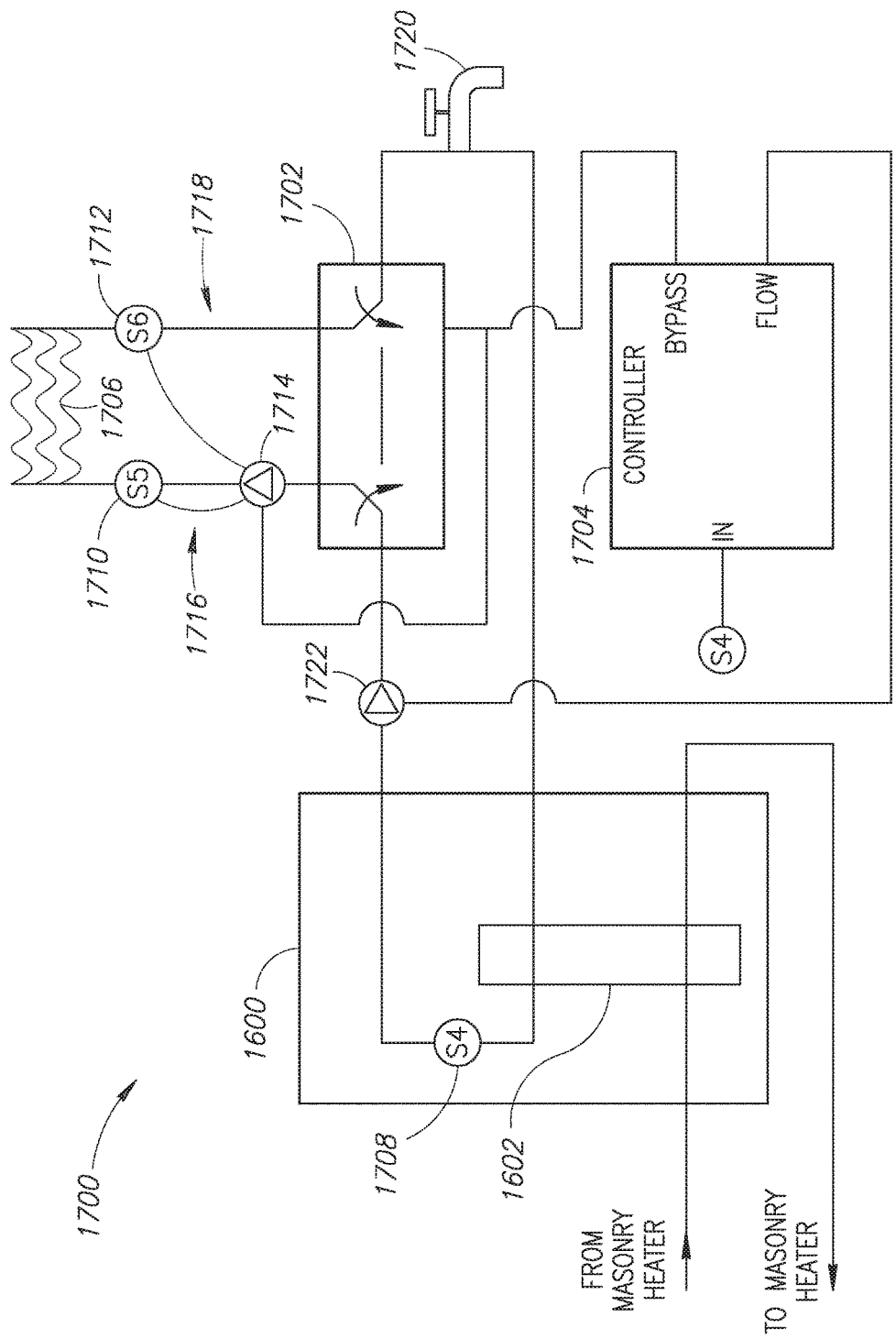
FIG. 17 illustrates a thermal dump apparatus and external heating device in a heat transfer system.

Referring to FIG. 17, an over-heat thermal dump apparatus 1700 may be connected to the heat transfer apparatus and heat transfer system to dump excess heat from the system. In normal operation, the second liquid in the liquid heater 1600 is may be directed to a domestic liquid outlet 1720, for example. As previously discussed, it is sometimes necessary to dump excess heat from the system to prevent vaporization of liquid in the system or damage to the system because masonry heaters 100 generate very large amounts of heat. In the configuration shown in FIG. 17, the thermal dump apparatus 1700 is connected to the liquid heater 1600 and is equipped with a relay bypass 1702 to direct the heated secondary liquid to a thermal dump zone (radiant heat zones 1706) where excess heat may be rapidly dumped. In this configuration, when the secondary liquid in the liquid heater 1600 reaches a predetermined temperature, as measured by temperature sensor 1708 (S4), at which there is a danger of the secondary liquid being vaporized, the relay bypass 1702 is activated, which transfers the heated second liquid to a radiant zone 1706 to dump heat. The radiant zone 1706 may be coil heating pipes distributed through the floor or walls of a building, efficiently using the excess heat in areas of a building that are remotely located away from the masonry heater 100.

In normal operation, when the temperature of the second liquid is below the predetermined temperature, the second liquid flows from the liquid heater 1600 through the liquid circulation pump 1604, and directly through the relay bypass 1702. When the temperature of the second liquid exceeds the predetermined temperature, the controller 1704 operates the relay bypass 1702 to direct the second liquid toward the radiant heat zones 1706. The controller 1704 may be configured operate the relay bypass 1704 to dump heat between 160° F. and 180° F., well-before the liquid is vaporized. The radiant zone 1706 may be installed in a cooler area of a building, such as a garage, where heat may be more rapidly dumped than an interior room of a building. The liquid heater 1600 in FIG. 17 may be an HTP Versa-Hydro Combination Hydronic Appliance, by way of non-limiting example.

In FIG. 17, temperature sensors S4, S5 and S6 are located on a supply side 1716 and return side 1718 of the relay bypass 1702 to measure the temperature differential between sensors S5 and S6, which indicates an amount of heat being dumped to a radiant zone 1706. The heat measured on the supply side 1716 by sensor 1710 (S5) should be higher than the ambient air temperature, but much lower than the boiling point of the second liquid used. The liquid circulation pump 1714 controls the flow rate of the liquid in the radiant heat zones 1706 based on the measured heat differential between sensors S4 and S5. The controller 1704 may direct the liquid circulation pump 1722 to stop controlling the flow of fluid in a thermal dump mode, allowing the liquid circulation pump 1714 to control the flow rate. Alternatively, the controller 1714 may control the liquid circulation pump 1714 and liquid circulation pump 1722 in concert. Once the temperature measured by the sensor S4 falls below the predetermined temperature, the controller operates the relay bypass 1702 to pass liquid directly to the domestic liquid outlet 1720 and directs the liquid circulation pump 1714 to stop circulation of the second liquid.

The flow rate is controlled to achieve an ideal amount of heat dumped based on the size of the radiant zones. For example, a 20° F. differential between sensors S5 and S6 may be selected, such that the flow rate is increased when the amount of heat dumped is greater than 20° F., and the flow rate is decreased when the amount of heat dumped is less than 20° F. It is recommended to maintain the return side 1718 of the radiant zone at around 100° F., and the liquid in the supply side 1716 so it does not exceed 140° F. to ensure that the system does not enter thermal runaway. Control of heat transfer to the thermal dump zones is discussed in further detail later. Although the over-heat thermal dump control is described with reference to a liquid heater 1600, the over-heat thermal dump control may be connected to any other external heating device 208 to moderate temperature in the system. The controller for the thermal dump control may be a Johnson Controls A419GBF-1 (24 Volt DC), by way of non-limiting example. A single controller may be used to control circulation of liquid within the liquid heater 1600, the thermal dump zones 1706, and in the coil pipes 200.

Figure 18:
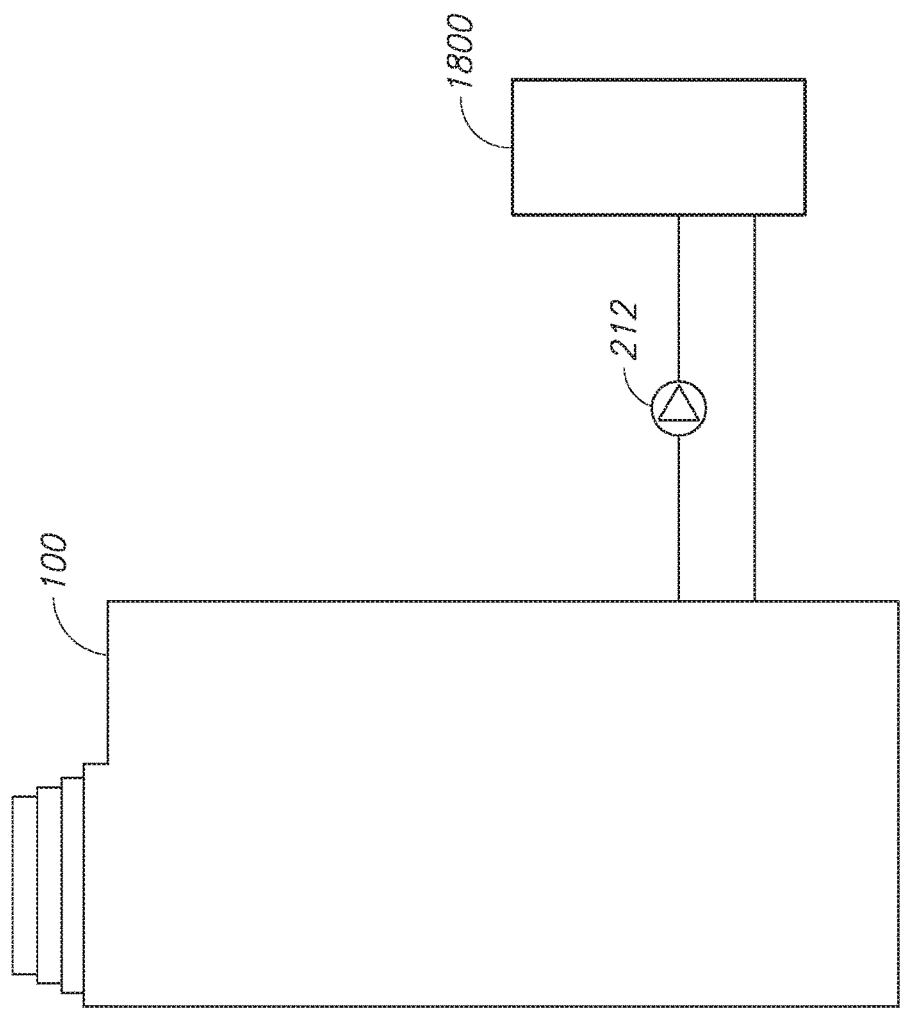
FIG. 18 illustrates an external heating device connected to a heat transfer apparatus.

FIG. 18 shows a configuration where the heated liquid from the masonry heater 100 is transferred to a duct coil 1800. The duct coil 1800 may be used in an HVAC system to distribute heat throughout a building via blown air.

Figure 19:
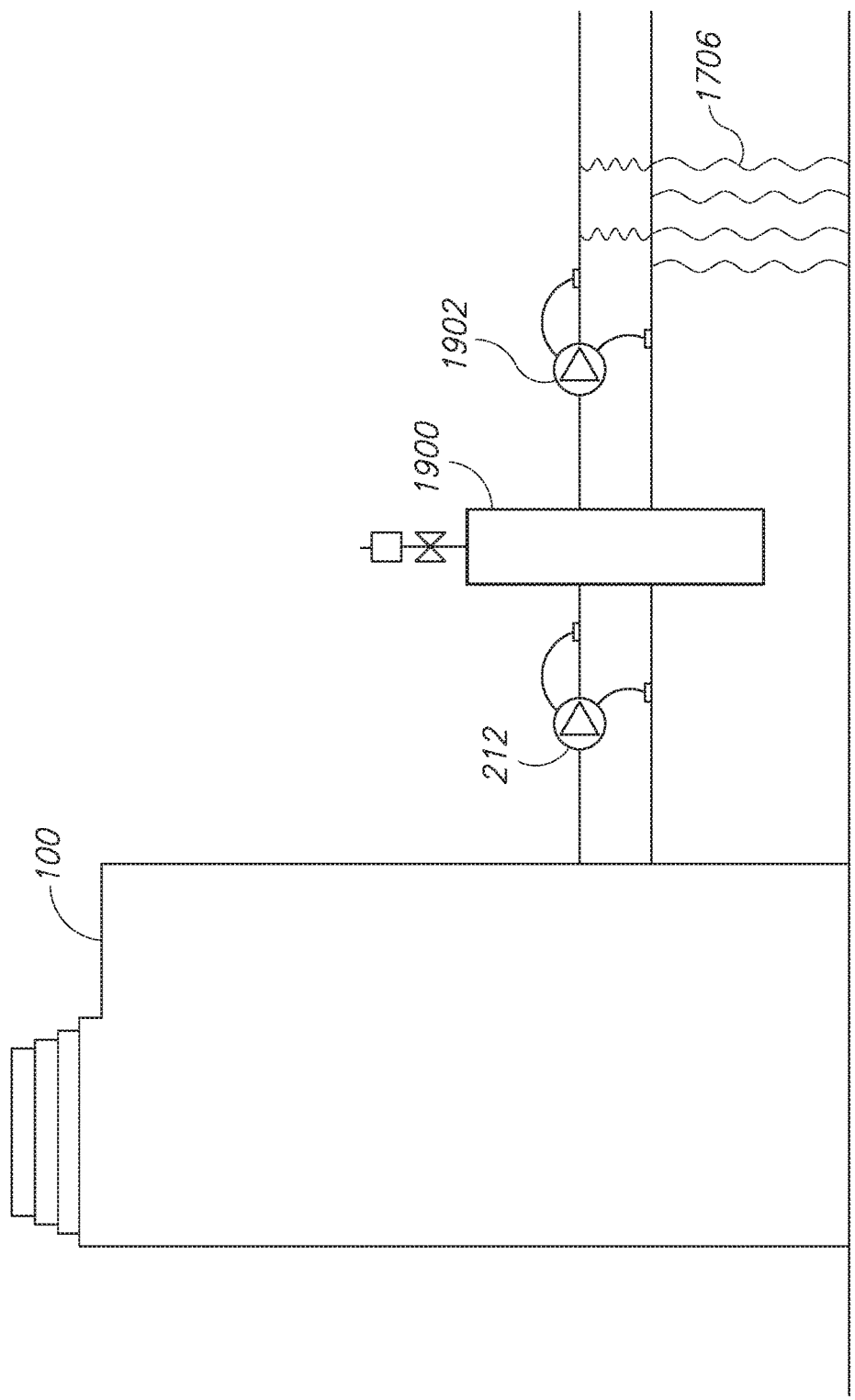
FIG. 19 illustrates two liquid circulation pumps and a low-loss header connected to a heat transfer apparatus.

Referring to FIG. 19, a low-loss header 1900 may be installed to provide hydraulic isolation between the masonry heater 100 side of the heat transfer apparatus and heat transfer system. The low loss header 1900 may be connected to one or more external heating devices 208, or may be connected to radiant heating, as shown in FIG. 19. Another liquid circulation pump 1902 may be connected to the secondary side of the low-loss header 1900 to control the flow rate of liquid on the secondary side relative to the primary side (i.e. the masonry heater 100 side).

Figure 20:
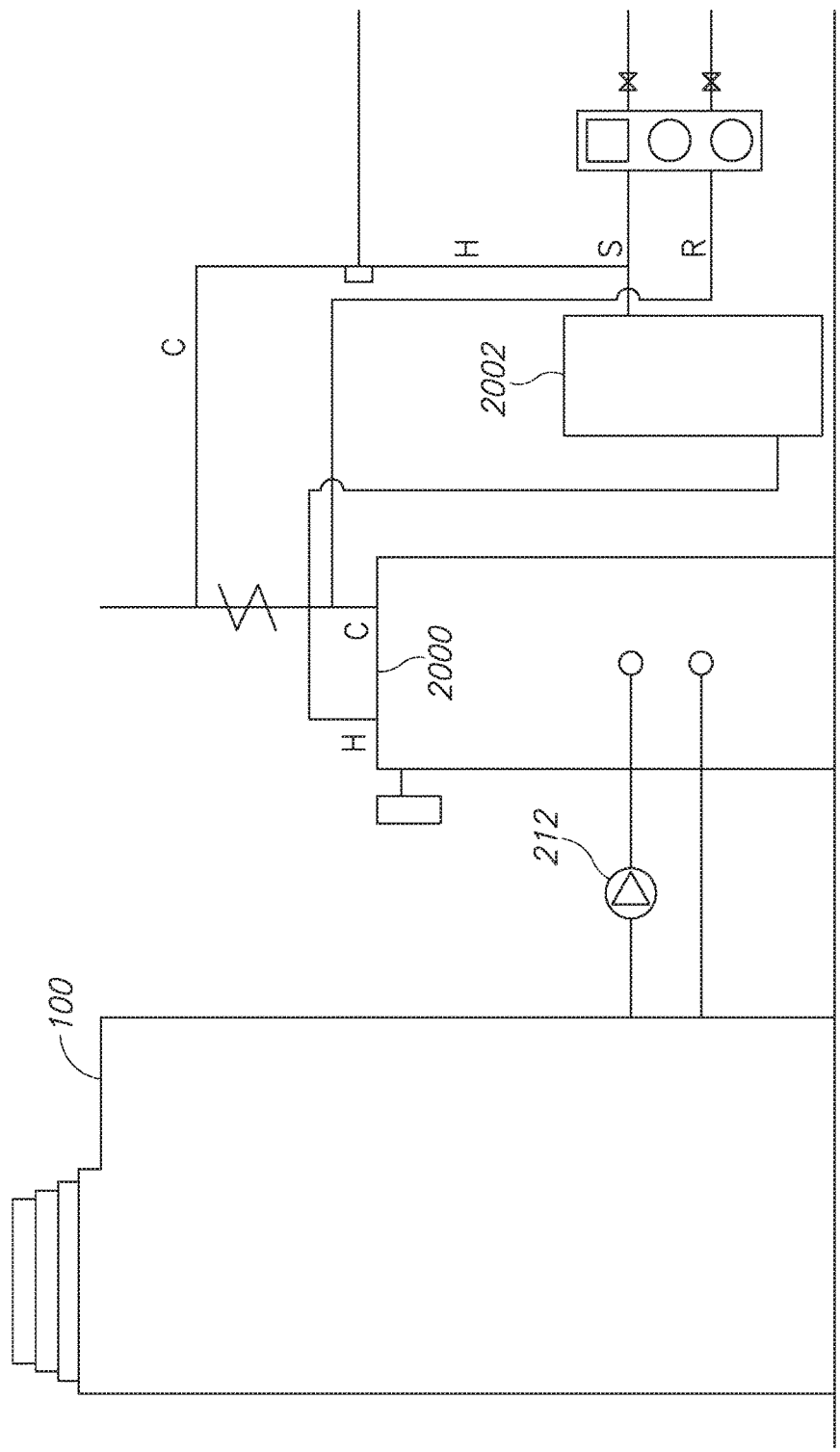
FIG. 20 illustrates two liquid heaters connected to a heat transfer apparatus.

Referring to FIG. 20, heated liquid from the masonry heater 100 may be ported into the element ports of a hot water heater 2000, where the heated liquid from the masonry heater 100 may heat domestic water via a heat exchanger (not illustrated). The heated water from the hot-water heater may then further be used in an oil heater 2002, such as a Toyotomi oil miser, greatly increasing the efficiency of the oil heater. As previously discussed, a thermal dump apparatus 1700 may be installed on the liquid heater 2000 to dump heat when the heat of the liquid in the liquid heater 2000 exceeds a predetermined temperature.

Figure 21A:
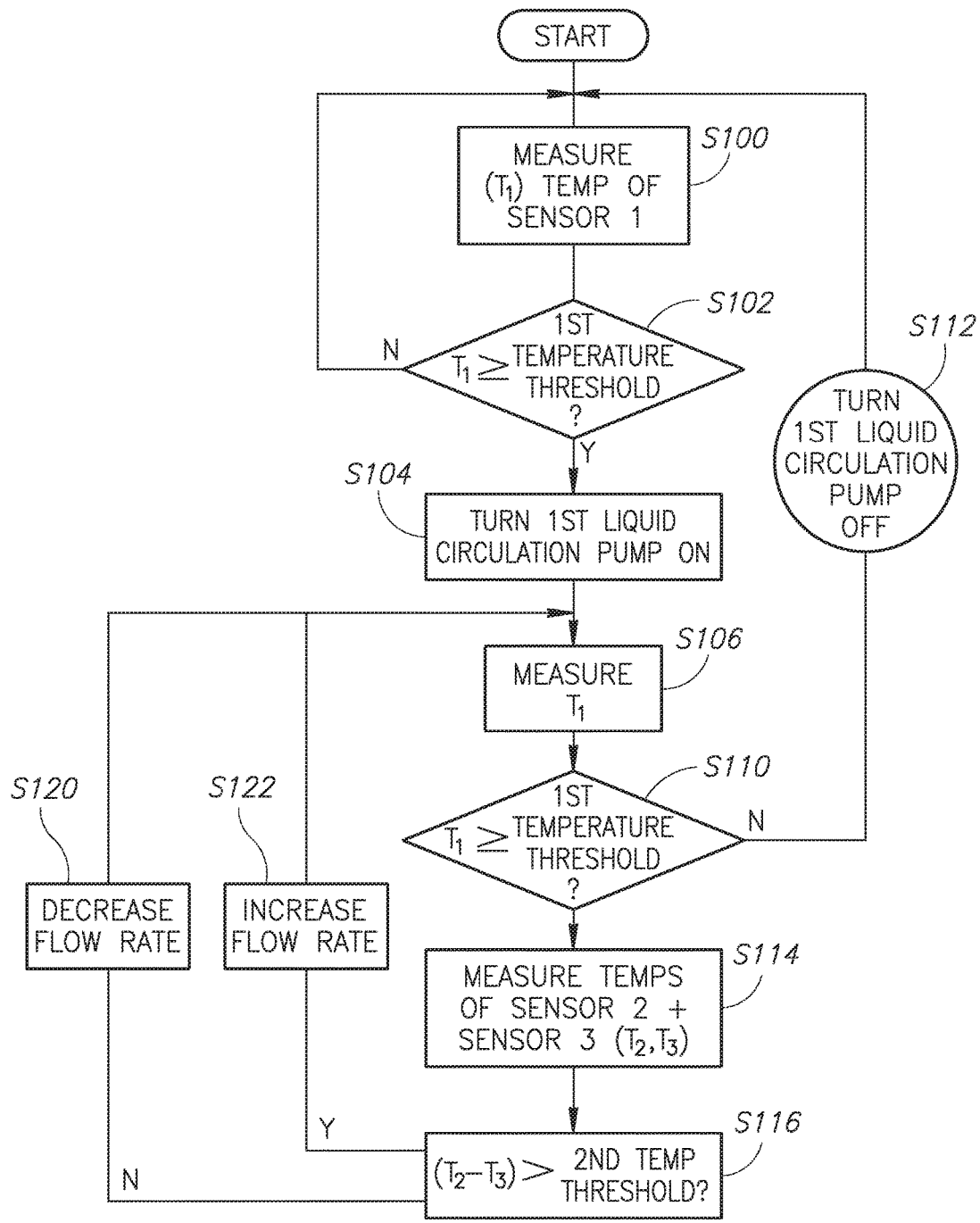
FIG. 21A illustrates a flow chart for controlling a liquid circulation pump.

FIG. 21A illustrates a flow chart describing the functionality of the controller 210 and the liquid circulation pump. In step S100, the temperature $T_1$ of sensor S1 in the coil pipe 200 within the masonry heater 100 is measured. If the temperature $T_1$ is less than a first predetermined temperature threshold (in step S102), the process proceeds back to step S1 where the temperature $T_1$ is measured again. If, on the other hand, the temperature $T_1$ is greater than or equal to a first predetermined temperature threshold (in step S102), the liquid circulation pump is activated (S104), and the liquid circulation pump begins to circulate liquid in the system. As step S106, the temperature $T_1$ is measured again, and if the temperature $T_1$ is less than the first predetermined temperature threshold at step S110, the first liquid circulation pump is turned off in step S112 and the process begins again at step S100. If the temperature $T_1$ remains equal to or greater than the first predetermined temperature threshold, the process proceeds to step S114. At step S122, the temperatures $T_2$ and $T_3$ of sensor S2 and sensor S3, respectively, are measured. At step S116, the difference ($T_2-T_3$) is determined, and if the difference ($T_2-T_3$) is greater than or equal to a predetermined temperature difference, the flow rate of the liquid circulation pump is increased (step S122). When the temperature is greater than the predetermined temperature difference, then too much heat is being transferred to the external heating device 208, so the flow rate is increased to decrease the amount of heat transferred to the external heating device 208. If, in step S116, the difference ($T_2-T_3$) is less than the predetermined temperature difference, then the flow rate is decreased to increase the amount of heat transferred (S12). Alternatively, the flow rate may be kept constant if the difference ($T_2-T_3$) is within an acceptable predetermined range.

Figure 21B:
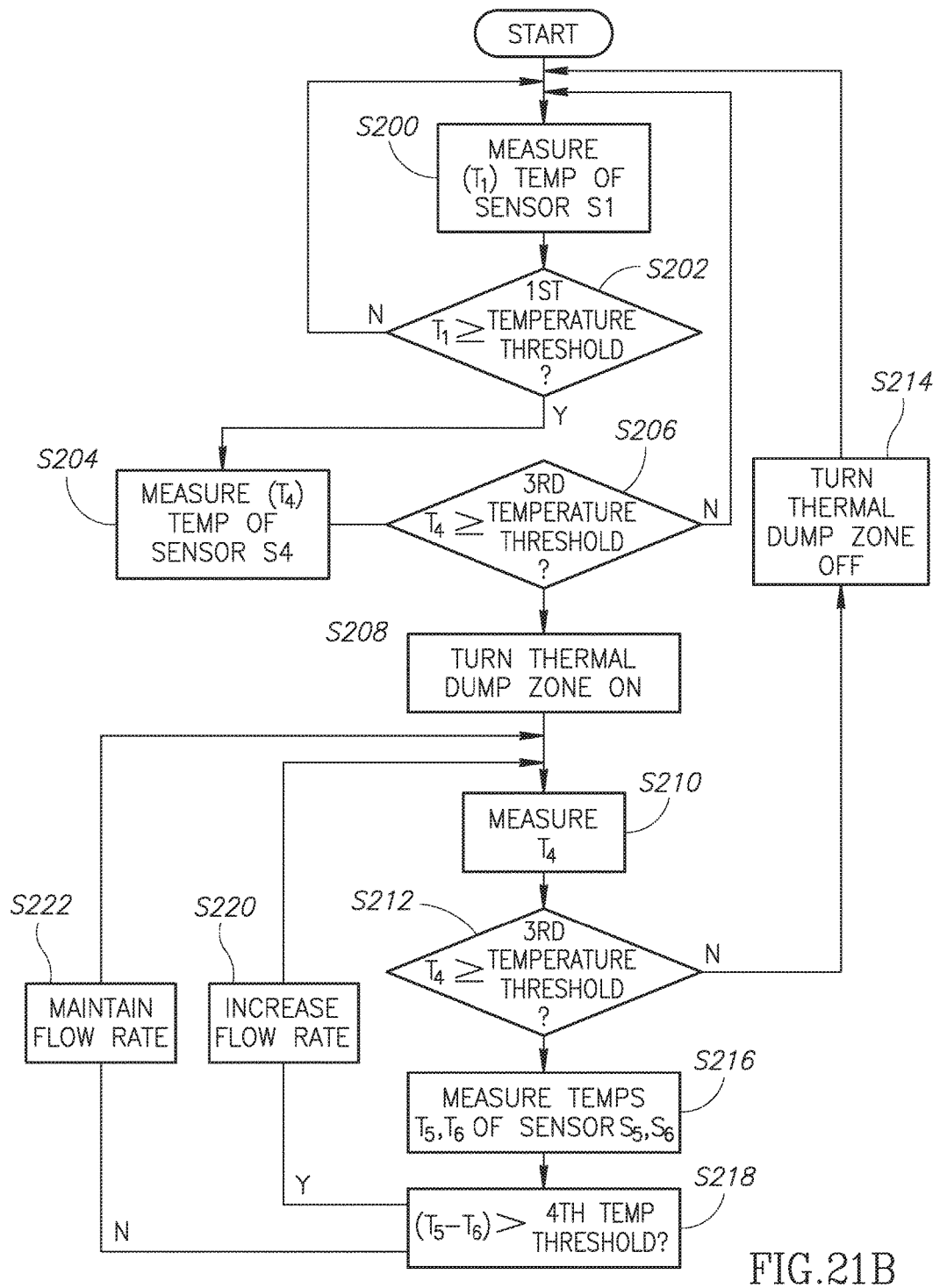
FIG. 21B illustrates a flow chart for controlling a heat transferred to a thermal dump zone.

Referring to FIG. 21B, a process for dumping excess heat is illustrated using the thermal dump apparatus illustrated in FIG. 17. In step S200, the temperature of sensor S1 is measured (in conjunction with the process discussed with respect to FIG. 21A), and when the temperature exceeds the first predetermined temperature threshold, the process proceeds to step S204 to measure the temperature of the second liquid in the liquid heater 1600. When the temperature of the liquid measured in the external heating device 208 exceeds a third temperature threshold in step S206, the process proceeds to step S208, where a relay bypass 1702 is operated to dump excess heat to radiant heating zones 1706. If the temperature measured by sensor S4 is less than the third temperature threshold in step 206, the process returns to step S200.

After the relay bypass 1702 begins directing the second liquid to the thermal dump zones 1706, the temperature of the sensor S4 is again measured in step S210. In step S212, when the measured temperature of the second liquid falls below the third temperature threshold, the relay bypass 1702 directs the second liquid away from the thermal dump zones 1706 and returns to the normal operation mode (step S214). When the temperature $T_4$ measured by sensor S4 is greater than the third temperature threshold, the liquid circulation pump 1714 circulates the second liquid to the thermal dump zones and the temperatures $T_5$ and $T_6$ of the second fluid at sensors S5 and S6, respectively, are measured (step S216). At step 218 the difference ($T_5-T_6$) is determined, and when the difference ($T_5-T_6$) is within a predetermined temperature range ($4^{th}$ temperature threshold), the liquid circulation pump 1714 maintains the current flow rate. The heat of the liquid in the thermal dump zones should be maintained to 165° F.-170° F., such that ($T_5-T_6$) should be approximately 5° F. It may be necessary to add more radiant heating zones if the temperature in the radiant zones exceeds 180° F. to keep the temperatures in the radiant zones comfortable. If the difference ($T_5-T_6$) exceeds the predetermined temperature range, the flow rate of the liquid transferred to the radiant heating zones is increased. If the difference ($T_5-T_6$) is within the predetermined temperature range, the flow rate is maintained in step S220 (or decreased where necessary to maintain an acceptable radiant temperature). Once enough heat is dumped from the secondary side of the external heating device 208 such that the temperature of the liquid in the external heating device 208 is less than the second temperature threshold, the relay bypass is turned off and the second liquid circulation pump stops pumping liquid to the dump zones (S214).

Figure 22:
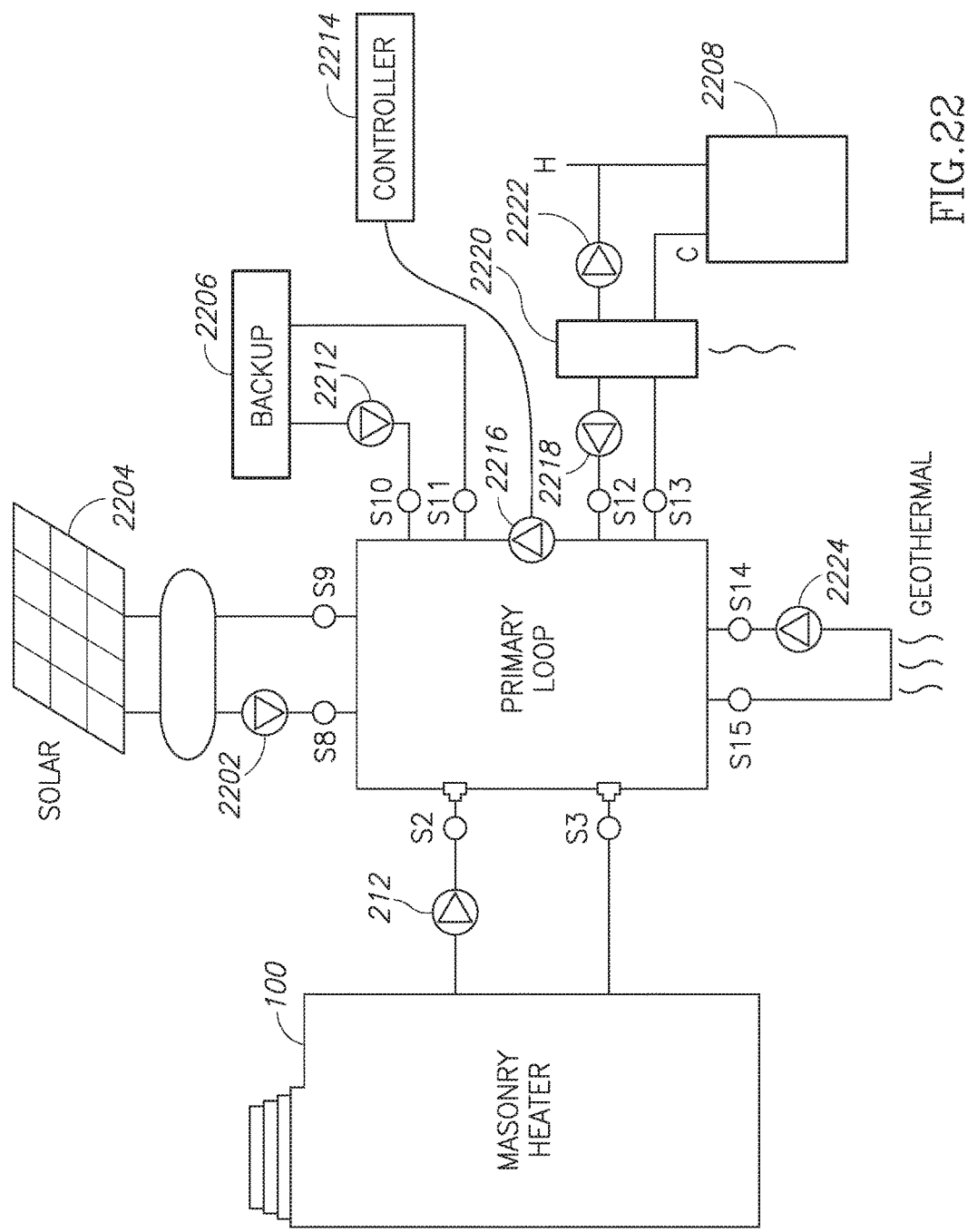
FIG. 22 illustrates a plurality of other heat sources connected to the masonry heater and external heating device in a heat transfer system.

Referring to FIG. 22, the previously-described heat transfer system may additionally include other heat sources to transfer heat to the external heating device 2208, including a geothermal heat source 2210, a solar heat source 2204, and/or a backup heat source 2206. The solar heat source 2204 may be a solar panel that generates electricity to power a heating element that heats the heat transfer liquid passing through a reservoir or pipe connected to the heating element. The solar heat source 2204 may be tubing or a container through which the heat transfer liquid flows that passively absorbs heat from the sun. The backup heat 2206 source may be a gas, oil or electric heat source that generates heat when the other heat sources are not producing the desired amount of heat. The geothermal heat source 2210 may be buried in the ground to absorb heat directly from the earth, or may absorb heat directly from the air on a hot summer day. Other known heat sources may be connected to the heat transfer system to achieve similar results.

The heat sources have a supply line and a return line each connected to closely spaced T-junctions placed in series around a primary loop 2200. A liquid circulation pump 2202, 2212, 2224 is disposed on at least one of the supply line and the return line of each of the heat sources to transfer heat by circulating a heat transfer liquid between the primary loop 2200 and each of the heat sources. A liquid circulation pump 2216 is also disposed in the primary loop 2200 to circulate the heat transfer liquid in the primary loop 2200 and uniformly distribute the heat transfer liquid between the heat sources.

At least one other heat source is connected to the primary loop 2200 via a supply line and a return line to receive heat from the primary loop 2200. Although a liquid heater 1600 is illustrated in FIG. 22, the external heat device 2208 may be one or more of a boiler, a low-loss header, or a duct coil, as previously described. In at least one of the supply line and return line of the external heating device 2208, a liquid circulation pump 2218 is installed to transfer heat toward the external heating device 2208 by circulating liquid from the primary loop 2200 to the external heating device 2208. A pump 2220 is installed between the liquid circulation pump 2218 and the external heating device 2208. The portion of the system on the primary loop side is a primary side while the portion of the system on the external heating device 2208 side is a secondary side. The pump 2220 prevents flow on the primary side from interfering with flow on the secondary side. On the secondary side, a liquid circulation pump 2222 may be used to control flow on the secondary side. As previously described, a plate heat exchanger 1602 in the liquid heater 2208 transfers heat from the heat transfer liquid to a second liquid. An over-heat thermal dump control, as discussed with respect to FIG. 17, may be connected on the secondary side to dump excess heat from the secondary side.

Each of the liquid circulation pumps 2202, 2212, 2224 controls the flow of the heat transfer liquid in the primary loop 2200 to and from each of the respective heat sources. Sensors S2-S15 should be placed as close to the T-junctions as possible to measure the heat transfer to the primary loop from each of the heat sources. A primary circulation pump 2216 is disposed in the primary loop to control flow of the heat transfer liquid around the primary loop 2200. The primary circulation pump 2216 may be connected to a controller 2214 that controls whether the primary circulation pump 2216 circulates the heat transfer liquid around the primary loop 2200, as well as the flow rate of the heat transfer liquid around the primary loop 2200. The other liquid circulation pumps 212, 2202, 2212, 2218, 2222, 2224 may be also connected to the controller 2214 to control the amount of heat transferred to the external heating device 2208. The controller 2214 may be preprogrammed to transfer a specific amount of heat to the external heating device 2208 by controlling the primary circulation pump 2216 and other liquid circulation pumps 212, 2202, 2212, 2218, 2222, 2224 in concert. Specifically, the controller controls whether each of the liquid circulation pumps circulate liquid through the masonry heater 100 and/or each of the other heat sources, as well as the flow rates of the liquid in the primary loop 2200 and/or the heat sources through which the liquid is flowing. The controller 2214 may also control the flow rate of liquid on the secondary side and the thermal dump control on the secondary side when necessary. When the masonry heater 100 is fired, it may not be necessary to transfer heat from any of the other heat sources to the external heating device 208. In the summer, when the weather may be too hot to fire the masonry heater 100, heat from the solar heat source and geothermal heat source may be transferred to the external heating device 2208 without circulating liquid to the masonry heater 100. In this configuration, the heat transfer system may efficiently transfer heat to one or several external heating devices 2208 year round, greatly reducing the cost of heating.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare statement of "two recitations," without other modifiers, typically means at least two recitations, or two or more recitations).

What is claimed is:

1. A heat transfer apparatus for a masonry heater, the heat transfer apparatus comprising:
    a coil pipe having a first portion winding back and forth in a firebox of the masonry heater and positioned to be exposed to fire in the firebox, and a second portion extending between an exterior surface of the masonry heater and an interior surface of the masonry heater at the firebox, a liquid circulation path of the heat transfer apparatus extending continuously at least through the first portion and the second portion of the coil pipe;
    a first sensor disposed in the liquid circulation path within the first portion of the coil pipe which is within the firebox and exposed to fire in the firebox on a return side of the coil pipe, at least a portion of the first sensor extending at least partially through the second portion of the coil pipe in the liquid circulation path, the first sensor being configured to detect a temperature of a heat transfer liquid in the liquid circulation path at the return side of the coil pipe;
    a circulation pump configured to transfer the heat transfer liquid from the coil pipe to an output of the heat transfer apparatus as a result of the circulation pump being in an operational state; and
    a controller configured to control whether the circulation pump is in the operational state based at least in part on the temperature detected by the first sensor.

2. The heat transfer apparatus according to claim 1, wherein the coil pipe is oriented in a substantially horizontal direction of the masonry heater.

3. The heat transfer apparatus according to claim 1, wherein the coil pipe is adjacent to a side of the masonry heater.

4. The heat transfer apparatus according to claim 1, the heat transfer apparatus further including:
    a first valve located on an outside of the masonry heater, the first valve being connected to a supply side of the coil pipe and configured to permit the heat transfer liquid to flow only in one direction, the one direction being into the supply side and out of the return side of the coil pipe.

5. The heat transfer apparatus of claim 4, wherein a second valve is connected to the return side of the coil pipe, the second valve configured to purge gas from the heat transfer apparatus.

6. The heat transfer apparatus of claim 5, wherein a third valve is connected to the return side of the coil pipe, the third valve configured to purge at least some of the heat transfer liquid from the heat transfer apparatus when (i) a temperature of the heat transfer liquid exceeds a first temperature, or (ii) a pressure of the heat transfer liquid exceeds a predetermined pressure.

7. The heat transfer apparatus according to claim 1, the heat transfer apparatus further including:
    a junction disposed on outside of the masonry heater and attached to the coil pipe at the return side, wherein the first sensor is attached to the junction and extends from a first port of the junction, out of the junction from a second port of the junction, and into the second portion of the coil pipe.

8. The heat transfer apparatus of claim 7, wherein the junction being a T-junction having the first port and the second port disposed at opposite ends of a duct, and a third port disposed on a side of the duct, wherein the first sensor extends through the duct from the first port to the second port.

9. The heat transfer apparatus according to claim 1, further including:
    a second sensor that measures the temperature of the heat transfer liquid at the output of the heat transfer apparatus, downstream of the first sensor and the circulation pump; and
    a third sensor that measures the temperature of the heat transfer liquid at an input of the heat transfer apparatus, wherein the heat transfer liquid at the input of the heat transfer apparatus is liquid that was transferred from the output of the heat transfer apparatus to an external heating device, and that has reentered the heat transfer apparatus at the input of the heat transfer apparatus, and wherein the controller is configured to control a variable flow rate of the circulation pump based on a first temperature difference between the temperatures measured by the second sensor and the third sensor.

10. The heat transfer apparatus according to claim 1, wherein the controller is configured to control the circulation pump to not cause transfer of the heat transfer liquid as a result of the first sensor detecting that the temperature of the heat transfer liquid on the return side is less than a second temperature, and the controller controls the circulation pump to transfer the heat transfer liquid as a result of the first sensor detecting that the temperature of the heat transfer liquid on the return side is greater than the second temperature.

11. The heat transfer apparatus according to claim 1, further comprising a second coil pipe at least partially disposed within the firebox vertically adjacent to the coil pipe, the coil pipe and the second coil pipe extending from the firebox to an exterior of the masonry heater, wherein, as a result of the circulation pump being in the operational state, the heat transfer liquid being transferred from within the firebox to the exterior of the masonry heater.

12. The heat transfer apparatus according to claim 11, wherein the second coil pipe is oriented in a substantially horizontal direction of the masonry heater.

13. The heat transfer apparatus according to claim 11, wherein the second coil pipe is adjacent to a side of the masonry heater.

14. The heat transfer apparatus according to claim 1, wherein the first sensor extends into the masonry heater a length of at least three inches.

15. The heat transfer apparatus according to claim 1, wherein a length of the coil pipe in the firebox is at least nine feet.

16. The heat transfer apparatus according to claim 1, wherein a diameter of the coil pipe is approximately 0.75 inches.

17. The heat transfer apparatus of claim 1, wherein the first sensor comprises an elongated sheath housing a thermal sensor, the elongated sheath sized to fit within and extend along a length of the return side of the coil pipe.

18. A heat transfer apparatus for a masonry heater, the heat transfer apparatus comprising:
- a coil pipe having a first portion winding back and forth in a firebox of the masonry heater and positioned to be exposed to fire in the firebox, and a second portion extending between an exterior surface of the masonry heater and an interior surface of the masonry heater at the firebox, a liquid circulation path of the heat transfer apparatus extending continuously at least through the first portion and the second portion of the coil pipe;
- a first sensor disposed in the liquid circulation path on a return side of the coil pipe, at least a portion of the first sensor extending at least partially through the second portion of the coil pipe in the liquid circulation path, the first sensor being configured to detect a temperature of a heat transfer liquid in the liquid circulation path at the return side of the coil pipe;
- a circulation pump configured to transfer the heat transfer liquid from the coil pipe to an output of the heat transfer apparatus as a result of the circulation pump being in an operational state;
- a controller configured to control whether the circulation pump is in the operational state based at least in part on the temperature detected by the first sensor;
- a second sensor that measures the temperature of the heat transfer liquid at the output of the heat transfer apparatus, downstream of the first sensor and the circulation pump; and
- a third sensor that measures the temperature of the heat transfer liquid at an input of the heat transfer apparatus, wherein the heat transfer liquid at the input of the heat transfer apparatus is liquid that was transferred from the output of the heat transfer apparatus to an external heating device, and that has reentered the heat transfer apparatus at the input of the heat transfer apparatus, and wherein the controller is configured to control a variable flow rate of the circulation pump based on a first temperature difference between the temperatures measured by the second sensor and the third sensor; and
- wherein the controller is configured to determine a first temperature difference between the temperatures measured by the second sensor and the third sensor, the controller is configured to increase the variable flow rate of the circulation pump as a result of the first temperature difference is greater than a first temperature threshold, and the controller is configured to decrease the variable flow rate of the circulation pump as a result of the first temperature difference is less than the first temperature threshold.

19. A heat transfer system comprising:
- a masonry heater having a firebox;
- a coil pipe having a first portion winding back and forth in the firebox and being positioned to be exposed to fire in the firebox, a second portion extending between an exterior surface of the masonry heater and an interior surface of the masonry heater at the firebox, a liquid circulation path extending continuously at least through the first portion and the second portion of the coil pipe;
- a first sensor disposed in the liquid circulation path within the first portion of the coil pipe which is within the firebox and exposed to fire in the firebox on a return side of the coil pipe, at least a portion of the first sensor extending at least partially through the second portion of the coil pipe in the liquid circulation path, the first sensor being configured to detect a temperature of a heat transfer liquid in the liquid circulation path at the return side of the coil pipe;
- a heating device connected to the return side of the coil pipe to absorb heat from the heat transfer liquid transferred from the masonry heater;
- a circulation pump configured to transfer the heat transfer liquid through the coil pipe to an output of the coil pipe as a result of the circulation pump being in an operational state; and
- a controller configured to control whether the circulation pump is in the operational state based at least in part on the temperature detected by the first sensor.

20. The heat transfer system according to claim 19, wherein the heating device is a liquid heater configured to heat a second liquid using the heat transferred from the masonry heater, the heat transfer system further comprising:
- a second sensor coupled to the liquid heater and configured to detect the temperature of the second liquid in the liquid heater; and
- a thermostat configured to receive a temperature setting for maintaining the second liquid in the liquid heater at a specified temperature, the thermostat being in communication with the second sensor and configured to receive information corresponding to a temperature measurement from the second sensor.

21. The heat transfer system of claim 20, further comprising:
- a valve connected to a downstream side of the liquid heater and configured to receive the second liquid from the liquid heater;
- a second sensor coupled to the liquid heater and configured to detect the temperature of the second liquid in the liquid heater; and
- a thermostat configured to receive a temperature setting for maintaining the second liquid in the liquid heater at a specified temperature, the thermostat being communicatively coupled to the second sensor.

22. The heat transfer system of claim 20, further comprising:
- a valve in fluid communication with the liquid heater so as to receive the second liquid from the liquid heater, the valve being in an open position allowing the valve to transfer liquid from the liquid heater responsive to receipt of a first control signal from the thermostat, and the valve being in a closed position responsive to receipt of a second control signal from the thermostat, the open position and the closed position preventing the valve from transferring liquid from the liquid heater, wherein the thermostat is configured to provide the first control signal based at least in part on the information received from the second sensor indicating that the temperature measurement exceeds the specified temperature.

23. The heat transfer system according to claim 19, wherein the heating device is a liquid heater that heats a second liquid using the heat transferred from the masonry heater, the liquid heater comprising a plate heat exchanger, wherein the liquid transferred from the masonry heater heats the plate heat exchanger, and the plate heat exchanger heats the second liquid.

24. The heat transfer system according to claim 19, the heat transfer system further comprising:
- a second sensor that measures the temperature of the liquid at the output of the coil pipe, downstream of the first sensor and the circulation pump; and
- a third sensor that measures the temperature of the liquid at an input of the coil pipe, wherein the liquid at the input of the coil pipe is liquid that was transferred from the output of the coil pipe to an external heating device, and that has reentered the coil pipe at the input of the coil pipe; and wherein the controller is configured to control a flow rate of the circulation pump based on a first temperature difference between the temperatures measured by the second sensor and the third sensor.

25. The heat transfer system according to claim 19, wherein the controller is configured to control the circulation pump to not cause transfer of the liquid as a result of the first sensor detecting that the temperature of the heat transfer liquid in the second portion of the coil pipe is less than a second temperature, and the controller controls the circulation pump to transfer the heat transfer liquid as a result of the first sensor detecting that the temperature of the liquid in the second portion is greater than the second temperature.

26. The heat transfer system of claim 19, further comprising:
a second coil pipe being vertically adjacent to the coil pipe in the firebox of the masonry heater, the second coil pipe winding back and forth in the firebox and being positioned to be exposed to fire in the firebox, wherein the heat transfer liquid enters the second coil pipe from a supply side of the second coil pipe and the heat transfer liquid exits the coil pipe from the second coil pipe, the circulation pump being configured to transfer the heat transfer liquid out of a return side of the second coil pipe as a result of the circulation pump being in the operational state.

27. The heat transfer system of claim 19, wherein a tip portion of the first sensor is positioned within the firebox of the masonry heater.

28. A heat transfer system comprising:
a masonry heater having a firebox;
a coil pipe having a first portion winding back and forth in the firebox and being positioned to be exposed to fire in the firebox, a second portion extending between an exterior surface of the masonry heater and an interior surface of the masonry heater at the firebox, a liquid circulation path extending continuously at least through the first portion and the second portion of the coil pipe;
a first sensor disposed in the liquid circulation path on a return side of the coil pipe, at least a portion of the first sensor extending at least partially through the second portion of the coil pipe in the liquid circulation path, the first sensor being configured to detect a temperature of a heat transfer liquid in the liquid circulation path at the return side of the coil pipe;
a heating device connected to the return side of the coil pipe to absorb heat from the heat transfer liquid transferred from the masonry heater;
a circulation pump configured to transfer the heat transfer liquid through the coil pipe to an output of the coil pipe as a result of the circulation pump being in an operational state;
a controller configured to control whether the circulation pump is in the operational state based at least in part on the temperature detected by the first sensor;
a second sensor that measures the temperature of the liquid at the output of the coil pipe, downstream of the first sensor and the circulation pump; and
a third sensor that measures the temperature of the liquid at an input of the coil pipe, wherein the liquid at the input of the coil pipe is liquid that was transferred from the output of the coil pipe to an external heating device, and that has reentered the coil pipe at the input of the coil pipe; and wherein:
the controller is configured to control a flow rate of the circulation pump based on a first temperature difference between the temperatures measured by the second sensor and the third sensor,
the controller is configured to determine a first temperature difference between the temperatures measured by the second sensor and the third sensor,
the controller is configured to increase the flow rate of the circulation pump as a result of the first temperature difference being greater than a first temperature threshold, and
the controller is configured to decrease the flow rate of the circulation pump as a result of the first temperature difference being less than the first temperature threshold.

29. A heat transfer apparatus for a masonry heater, the heat transfer apparatus comprising:
a coil pipe having a first portion winding back and forth in a firebox of the masonry heater and positioned to be exposed to fire in the firebox, and a second portion extending between an exterior surface of the masonry heater and an interior surface of the masonry heater at the firebox, a liquid circulation path of the heat transfer apparatus extending continuously at least through the first portion and the second portion of the coil pipe;
a first sensor disposed in the liquid circulation path within the first portion of the coil pipe which is within the firebox and exposed to fire in the firebox, the first sensor being configured to detect a temperature of a heat transfer liquid in the liquid circulation path;
a circulation pump configured to transfer the heat transfer liquid from the coil pipe to an output of the heat transfer apparatus as a result of the circulation pump being in an operational state; and
a controller configured to control whether the circulation pump is in the operational state based at least in part on the temperature detected by the first sensor.

30. A heat transfer system comprising:
a masonry heater having a firebox;
a coil pipe having a first portion winding back and forth in the firebox and being positioned to be exposed to fire in the firebox, a second portion extending between an exterior surface of the masonry heater and an interior surface of the masonry heater at the firebox, a liquid circulation path extending continuously at least through the first portion and the second portion of the coil pipe;
a first sensor disposed in the liquid circulation path within the first portion of the coil pipe which is within the firebox and exposed to fire in the firebox, the first sensor being configured to detect a temperature of a heat transfer liquid in the liquid circulation path;
a heating device connected to a return side of the coil pipe to absorb heat from the heat transfer liquid transferred from the masonry heater;
a circulation pump configured to transfer the heat transfer liquid through the coil pipe to an output of the coil pipe as a result of the circulation pump being in an operational state; and
a controller configured to control whether the circulation pump is in the operational state based at least in part on the temperature detected by the first sensor.

\* \* \* \* \*